United States Patent [19]

Kawaguchi

[11] 4,384,458
[45] May 24, 1983

[54] VARIABLE RATIO BRAKE MASTER CYLINDER WITH RELIEF ACCUMULATOR

[75] Inventor: Hiroshi Kawaguchi, Mishima, Japan

[73] Assignee: Toyota Jidosha Kogyo Kabushiki Kaisha, Toyota, Japan

[21] Appl. No.: 190,747

[22] Filed: Sep. 25, 1980

[30] Foreign Application Priority Data

| Oct. 3, 1979 [JP] | Japan | 54-128135 |
| Oct. 3, 1979 [JP] | Japan | 54-128136 |
| Oct. 3, 1979 [JP] | Japan | 54-128137 |
| Oct. 3, 1979 [JP] | Japan | 54-128138 |
| Feb. 12, 1980 [JP] | Japan | 55-17050 |

[51] Int. Cl.³ ............................................ B60T 11/20
[52] U.S. Cl. ...................................... 60/562; 60/578; 60/582; 60/589
[58] Field of Search ............... 60/562, 574, 575, 578, 60/582, 561, 589

[56] References Cited

U.S. PATENT DOCUMENTS

| 3,312,062 | 4/1967 | MacDuff | 60/562 |
| 3,662,552 | 5/1972 | Ochiai | 60/562 |
| 3,667,229 | 6/1972 | Cresto | 60/578 |
| 3,698,190 | 10/1972 | Miyai | 60/582 |
| 4,156,348 | 5/1979 | Brown | 60/578 |
| 4,254,624 | 3/1981 | Gaiser | 60/574 |

Primary Examiner—Abraham Hershkovitz
Attorney, Agent, or Firm—Birch, Stewart, Kolasch & Birch

[57] ABSTRACT

A brake master cylinder device includes a first and a second cylinder bore formed within a body. A piston member is formed with a first piston and a second piston, which are respectively engaged with the first and the second cylinder bores to define a first and a second cylinder chamber, the arrangement being such that when the piston member is moved in a certain direction the volumes of both the first and the second cylinder chambers are reduced together. The piston member is biased in the direction opposite to said certain direction. A fluid conduit opens from the second cylinder chamber for connection to a brake actuator. A means for transferring fluid allows brake fluid to pass substantially freely from the first cylinder chamber to the second cylinder chamber. A fluid accumulator is communicated with the first cylinder chamber, and commences to accumulate fluid from it when the pressure in it rises to a predetermined pressure value. At least when the piston member is in its extreme position in said opposite direction, a means for refilling the first cylinder chamber allows fluid to flow freely from a fluid reservoir to the first fluid chamber. Thus a two-stage performance of brake application is available.

29 Claims, 15 Drawing Figures

VARIABLE RATIO BRAKE MASTER CYLINDER WITH RELIEF ACCUMULATOR

BACKGROUND OF THE INVENTION

The present invention relates to a brake master cylinder device for use in vehicles such as automobiles, and, more particularly, relates to a brake master cylinder device in which the mechanical advantage obtained by the operator of the vehicle, as he presses on the brake pedal thereof in order to apply actuating force to the braking system of the vehicle, is advantageously arranged to vary.

In many vehicles such as automobiles there are conventionally used hydraulic fluid braking systems in which: a brake pedal or other braking member of the vehicle is depressed by the operator thereof, the force exerted on this braking member is converted by a brake master cylinder device into hydraulic brake fluid pressure, and this hydraulic brake fluid pressure is transmitted via a conduit system to one or more fluid actuators of braking systems, which act upon the road wheels of the vehicle, and in which a friction member such as a brake shoe or a brake pad is pushed by said hydraulic brake fluid pressure against a rotating member which rotates along with the road wheels of the vehicle such as a brake drum or a brake disk, in order to perform braking action.

In such a hydraulic fluid braking system, typically, there is provided a certain clearance between the friction member such as a brake shoe or a brake pad, and the rotary member such as a brake drum or brake disk. Recently, it has become practiced to provide a considerably large clearance between such a friction member and such a rotary member, from the point of view of guarding against dragging or rubbing of the brakes of the vehicle, which can greatly reduce the efficiency of operation of the vehicle, and increase the fuel consumption thereof.

In the process of application of such a braking system, there are two distinct phases.

First, as the brake pedal or other braking member of the vehicle is initially moved by the operator thereof, the brake master cylinder device expels fluid into the conduit system and thence into the abovementioned hydraulic actuator or actuators, so as, initially, to take up the said clearance, by moving the friction member or members such as a brake shoe or brake pad into initial gentle contact with the rotary member or members such as a brake drum or brake disk. The hydraulic brake fluid pressure required for taking up this initial clearance is relatively low. However, the total amount of hydraulic brake fluid required to be displaced through the conduit system, for taking up this clearance, is quite large, since, as explained above, the clearance may be quite large. Therefore, in order to provide this fairly large quantity of hydraulic brake fluid through said conduit system at fairly low pressure, without the braking actuating member of the vehicle such as a brake pedal requiring to be moved through an undesirably large distance, it is desirable that the diameter of the hydraulic piston of the brake master cylinder device should be quite large, in order that, per unit amount of movement of this hydraulic piston, a comparatively large quantity of hydraulic brake fluid should be expelled from the brake master cylinder device through the conduit system. With such a large diameter brake master cylinder device, the mechanical advantage provided for the operator of the vehicle, as he presses upon the braking member thereof, is not very high.

On the other hand, in the second phase of braking operation, when the abovementioned clearance has been taken up, so that the friction member such as a brake pad or brake shoe is in gentle contact with the rotary member such as a brake disk or a brake drum, then, in order actually to perform substantial braking action to retard the motion of the vehicle, the pressing force between this friction member and this rotary member needs to be substantially increased. As this pressing force is increased, the friction member does not move very far, as compared to its amount of motion while taking up the abovementioned clearance in the first phase of operation. However, the force required to move the friction member is much greater than was required in the abovementioned first phase of operation. Thus, in this second phase of operation, a not very large amount of hydraulic brake fluid needs to be provided through the conduit system leading to the hydraulic actuator, but this not very large supply needs to be made available at quite high hydraulic pressure. Accordingly, therefore, it is desirable, for this phase of operation, to employ a brake master cylinder device, the diameter of the hydraulic piston of which is quite small, so that a high mechanical advantage is obtained by the driver of the vehicle as he presses on the braking member thereof, so that a sufficiently high hydraulic brake fluid pressure may be provided to the conduit system and to the hydraulic actuator, without an undue amount of pressure needing to be exerted by the driver on the brake member. In other words, the mechanical advantage provided by the brake master cylinder device should, in this phase, desirably be at a high level, which entails a small diameter for the hydraulic piston of the master cylinder device.

Therefore, it is seen that the requirements with regard to the diameter of a piston of a brake master cylinder device, in the abovementioned first and second stages of operation of the braking system of the vehicle, are somewhat opposed. Accordingly, therefore, in conventional designs of brake master cylinder device, a compromise has been found between the requirement of the first phase of brake operation, which is for a large diameter for the piston of the brake master cylinder device, and the requirement of the second phase, which is for a small diameter of the piston of the brake master cylinder device. However, finding this compromise has become more difficult, according to recent developments as mentioned above, in which the initial clearance between a friction member such as a brake pad or brake shoe, and a rotary member such as a brake disk or brake drum, has been increased. This has presented a substantial difficulty with regard to current design of brake master cylinder devices.

SUMMARY OF THE INVENTION

Therefore, in order to increase the amount of hydraulic brake fluid output from a brake master cylinder device, relative to the distance of movement of a braking member of a vehicle, it is required to increase the diameter of the piston of the brake master cylinder device. However, if this piston diameter is increased too much, when the friction member of a braking system is engaged with the rotary member thereof, so as to perform braking action, too high an actuating force will be required on the braking member of the vehicle, for providing a desired braking action. This will undesirably reduce the drivability of the automobile, and deteriorate the driving feel of the braking system thereof, causing, among other shortcomings, a requirement for a powerful power brake booster system.

Therefore, one of the objects of the present invention is to provide a brake master cylinder device which has a hydraulic brake fluid output amount which varies, according to the pressure at which said hydraulic brake fluid output needs to be provided.

A further object of the present invention is to provide a brake master cylinder device which provides, for a unit displacement of the piston thereof, a large hydraulic brake fluid output at a lower pressure, and then subsequently a smaller hydraulic brake fluid output at a higher pressure.

A further object of the present invention is to provide a brake master cylinder device which, in the initial stage of application of a braking system of a vehicle, provides a low mechanical advantage for the driver thereof, as he applies the braking system, and which, at a later stage in the braking operation of a vehicle, provides a higher mechanical advantage for the operator of the vehicle, as he operates the braking system thereof.

A further object of the present invention is to provide a brake master cylinder device which is capable of providing a sufficient quantity of hydraulic brake fluid, during the initial stages of brake operation, to take up a fairly large clearance in a braking system of a vehicle, while at the same time, providing, without requiring undue force to be applied to the braking member of the vehicle, a sufficiently high hydraulic brake fluid pressure to operate the braking system of the vehicle with sufficient force to provide a desirable good braking action thereby.

A yet further object of the present invention is to provide such a brake master cylinder device comprising a first cylinder chamber and a second cylinder chamber, both of the cylinder chambers being used during the first phase of braking operation, when a large hydraulic brake fluid output at low pressure is required, and only the second cylinder chamber being used during the second phase of brake operation, when a small hydraulic brake fluid output at high pressure is required.

It is a further object of the present invention to provide such a brake master cylinder device as detailed above, in which a one way valve is provided between the cylinder chambers thereof, which allows hydraulic brake fluid to flow only from the first cylinder chamber to the second cylinder chamber, and not in the reverse direction.

It is a yet further object of the present invention to provide such a brake master cylinder device as detailed above, in which a further valve is provided, which communicates the first cylinder chamber and the second cylinder chamber in a two-way fashion, until the hydraulic pressure in the first cylinder chamber exceeds a certain critical value.

It is a yet further object of the present invention to provide such a brake master cylinder device as detailed above, in which an accumulator is provided, communicated to the first cylinder chamber, in order to accumulate fluid compressed therein, when the pressure therein rises above said certain critical value.

It is a yet further object of the present invention to provide such a brake master cylinder device as detailed above, in which further a relief valve is provided, which vents the first cylinder chamber to a fluid reservoir, when the pressure therein becomes higher than a second critical value which is higher than the aforesaid first critical value.

It is a yet further object of the present invention to provide such a brake master cylinder device as detailed above, in which the first chamber is vented to a fluid reservoir, when the accumulator piston has moved through a distance which is larger than the distance through which it must move in order to actuate said valve to cut off said two-way communication between said first and second chamber.

It is a yet further object of the present invention to provide such a brake master cylinder device as detailed above, in which an external accumulator is provided to supplement the function of a primary accumulator provided inside the body of a piston member thereof.

It is a yet further object of the present invention to provide such a brake master cylinder device as detailed above, in which a one way valve is provided, which admits brake fluid into the first chamber thereof to refill it, when the pressure therein becomes less than atmospheric pressure.

It is a yet further object of the present invention to provide such a brake master cylinder device as detailed above, in which, when a piston member thereof is in its restored position wherein no braking effect is being provided, both the large and the small cylinder chamber thereof are freely refilled with brake fluid.

It is a yet further object of the present invention to provide such a brake master cylinder device as detailed above, in which, if an accumulator piston thereof should stick in its bore and not function, a pressure relief valve provides emergency venting for the first chamber thereof, thus ensuring continued braking action.

According to the present invention, these, and other, objects are accomplished by a brake master cylinder device, comprising: (a) a body within which are formed a first cylinder bore and a second cylinder bore; (b) a first piston member, comprising a first piston engaged with said first cylinder bore and a second piston engaged with said said cylinder bore, a first cylinder chamber and a second cylinder chamber being, respectively, defined by the cooperation of said first piston with said first cylinder bore and by the cooperation of said second piston with said second cylinder bore, the displacement of said first piston member to said body in a first direction tending to reduce the volume of said first cylinder chamber and also to reduce the volume of said second cylinder chamber; (c) a first means for biasing said first piston member in a direction opposite to said first direction with respect to said body; (d) a fluid reservoir; (e) a fluid conduit opening from said second cylinder chamber for connection to a brake actuator in order to supply operating fluid pressure thereto; (f) a fluid accumulator communicated wth said first cylinder chamber, which commences accumulating fluid therefrom when the fluid pressure therein rises to a predetermined pressure value; (g) a means for refilling said first cylinder chamber, which allows fluid to flow substantially freely from said fluid reservoir to said first cylinder chamber at least when said first piston member is in its extreme position in said direction opposite to said first direction; (h) a means for transferring fluid, which allows fluid to pass substantially freely from said first cylinder chamber to said second cylinder chamber; and (i) a means for releasing fluid from said second cylinder chamber towards said fluid reservoir, at least when said first piston member is in its extreme position in said direction opposite to said first direction; (j) whereby, as said first piston member is displaced in said first direction from its extreme position in said direction opposite to said first direction, as the pressure within said fluid conduit and said second cylinder chamber rises so as progressively to operate said brake actuator more and more, and until the pressure in said first cylinder chamber reaches said prdetermined pressure value, said pressure in said first cylinder chamber is substantially the same as that in said second cylinder chamber, said transferring means allowing substantially free passage of fluid from said first cylinder chamber to said second cylinder chamber; but, after the pressure in said firt cylinder chamber has reached said predetermined pressure value, further substantial rising of the fluid pressure within said first cylinder chamber only is hindered, as said accumulator starts to function and accumulates fluid from said first cylinder chamber; (k) whereby the pressure available in said fluid conduit, for a given amount of pressure exerted on said first piston member in said first direction, is first in the latter period of operation of said master cylinder device, after said accumulator has started to accumulate fluid from said first cylinder chamber, than in the former period of operation of said master cylinder device, before said accumulator has started to accumulate fluid from said first cylinder chamber.

According to such a structure, before the hydraulic fluid pressure in the fluid conduit, which is communicated with a brake actuator of the vehicle, increases beyond said predetermined pressure value, the effective diameter of the piston of the brake master cylinder device is the diameter of the first piston, and, accordingly, relative to a unit amount of movement of the brake actuator of the vehicle, which is coupled to the motion of the piston member, a large amount of hydraulic fluid, at a low pressure, is expelled through the fluid conduit. This supply of hydraulic fluid occurs by the hydraulic fluid from the first cylinder chamber being driven through the transferring means and through the second cylinder chamber into the fluid conduit. On the other hand, when the pressure required to be supplied by the brake master cylinder device rises to said predetermined pressure value, then the accumulator starts to operate, so that the further rise of fluid pressure within the first cylinder chamber is restricted by the accumulation of fluid, which is being compressed in the first cylinder chamber, in the accumulator. Accordingly, only the second cylinder chamber provides a supply of hydraulic fluid to the fluid conduit and to the braking system of the vehicle, and the effective diameter of the piston of the brake master cylinder device is the diameter of the second cylinder chamber. Thus, greater mechanical advantage is available for the driver of the vehicle. Fluid which is contained within the first cylinder chamber, thereafter, as the first cylinder chamber is further reduced in size by the movement of the first piston therein, is accumulated within the accumulator.

Thereby, the abovementioned desirable two stage performance of the brake master cylinder device is available, because in the first stage of operation, when the pressure in the first cylinder chamber is lower than said predetermined pressure value, a relatively large amount of hydraulic fluid is provided at a low pressure, per unit displacement of the piston member, thus ensuring that the abovementioned clearance is quickly taken up, while in the second stage of operation, when the pressure required to be provided is greater than said predetermined pressure value, then only a relatively small amount of hydraulic fluid is provided, per unit displacement of the piston member. Consequently, during the phase of actual operation of the braking system of the vehicle to slow the vehicle, a good mechanical advantage is obtained by the driver thereof, as he depresses the braking member such as a brake pedal of the vehicle. This provides a desirable drivability for the automobile, and a good braking feeling therefor.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

In what follows, the present invention will be described with reference to several preferred embodiments thereof, and with reference to the accompanying drawings.

Figure 1:
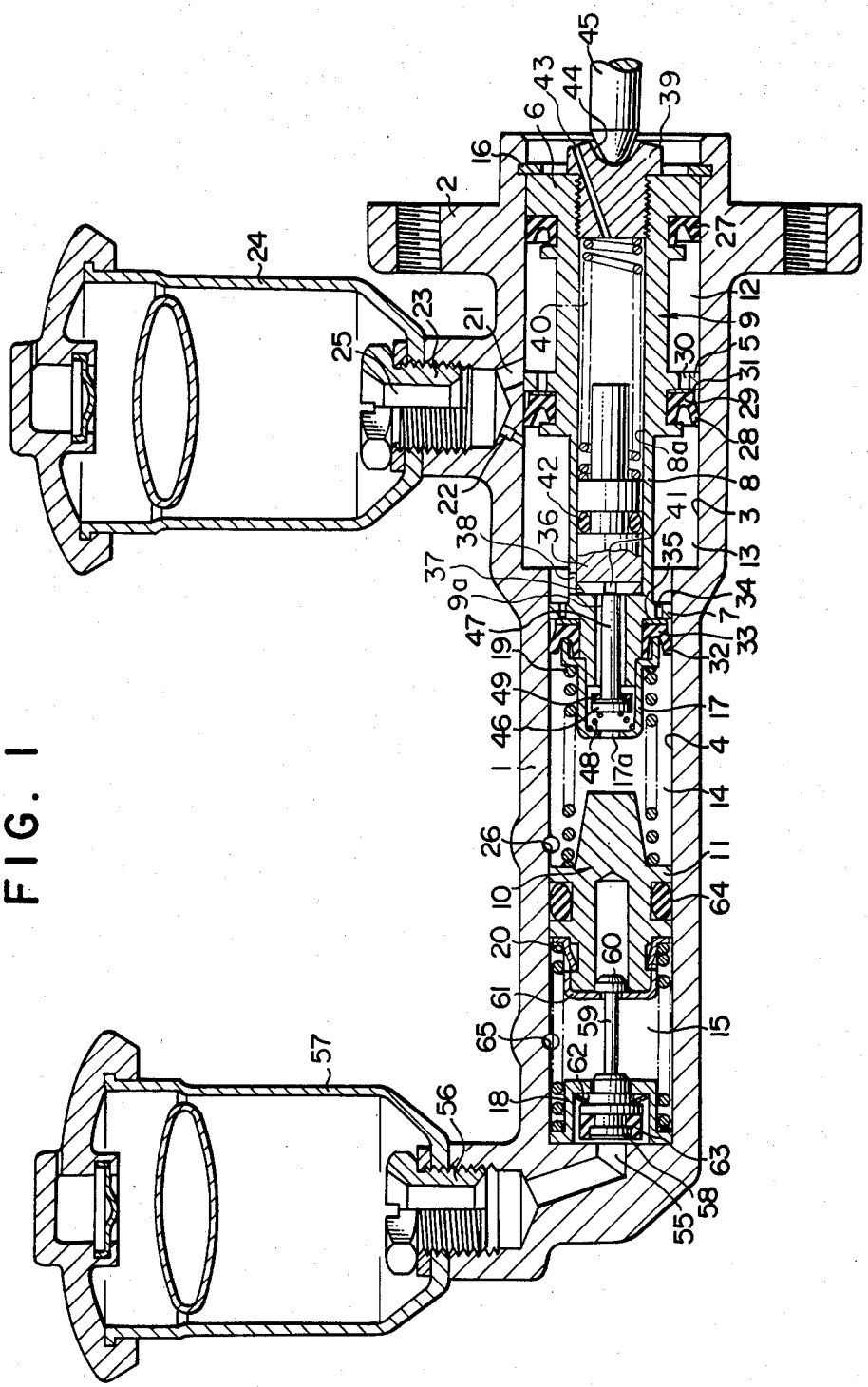
FIG. 1 is a vertical cross sectional view taken along the axis of a brake master cylinder device which is a first preferred embodiment of the present invention, and which is a tandem type master cylinder device having a valve at the end of a piston member, communicating a large and a small cylinder chamber thereof, and an accumulator formed in the piston member.

Referring to FIG. 1, in this first preferred embodiment, the present invention is applied to a brake master cylinder device which is a tandem master cylinder. However, this is not essential to the present invention, which, equally, could be applied to a single type brake master cylinder device.

In the following description, the terms "left", "right", "up", "down", etc., will be used freely. However, this is not intended to be limitative of the present invention, but is only with reference to the illustrative drawings shown, for convenience of explanation.

In FIG. 1, the brake master cylinder device therein shown comprises a master cylinder body member 1, at the right hand end of which is provided a fixing flanged portion 2 for mounting it to an appropriate part of a vehicle, not shown. Within the body member 1 there are bored a large diameter cylinder bore 3 generally on the right hand side thereof, and a small diameter cylinder bore 4 generally on the left hand side thereof. This large cylinder bore 3 and this small cylinder bore 4 are coaxial, and communicate with one another. The diameter of the small cylinder bore 4 is substantially smaller than the diameter of the large cylinder bore 3. The large cylinder bore 3 is open to its right hand end, whereas the small cylinder bore 4 is closed at its left hand end by a part of the body member 1.

Within the body member 1, there is provided a first piston member 9, which extends into both the large cylinder bore 3 and into the small cylinder bore 4, which is formed with a first large diameter piston land portion 5 and a second large diameter piston land portion 6, both of which are engaged with the large cylinder bore 3, and which is further formed with a small diameter piston land portion 7 which is engaged with the small cylinder bore 4. These three land portions are axially spaced along the axis of the first piston member 9. Further, provided within the body member 1, received in the small cylinder bore 4, there is a second piston member 10, which is formed with a pair of second piston member lands 11 which engage with the inner surface of the small cylinder bore 4. Both the first and second piston members 9 and 10 are axially slidable in the body member 1, i.e., along the axis of the large cylinder bore 3 and the small cylinder bore 4, leftwards and rightwards in the figure.

The travel of the first piston member 9 is restricted in its rightwards direction by a retaining snap ring 16 which is mounted in a circumferential slot cut in the inner surface of the large cylinder bore 3, and is restricted in its leftwards direction by a part of the first large piston land portion 5 coming into abutting contact with the step in the interior of the body member 1 formed between the large cylinder bore 3 and the small cylinder bore 4. The travel of the second piston member 10 in its axial direction to the left is restricted by its coming into contact, via a second piston member cap element 61 and an end cap shaped element 18 which will be described later, with the part of the body member 1 which closes the left hand end of the small cylinder bore 4, and the travel of the second piston member 10 is restricted in its axial direction to the right by its coming into contact with a first piston member cap element 17 which will be described later.

Thus, a first fluid chamber 12 is defined between the first large piston land portion 5 and the second large piston land portion 6 of the first piston member 9, in cooperation with the large cylinder bore 3; a second fluid chamber 13 is defined between the first large piston land portion 5 and the small piston land portion 7 of the first piston member 9, in cooperation with the large cylinder bore 3 and the small cylinder bore 4; a third fluid chamber 14 is defined between the small piston land portion 7 of the first piston member 9 and the second piston member lands 11 of the second piston member 10, in cooperation with the small cylinder bore 4; and a fourth fluid chamber 15 is defined between the second piston member lands 11 of the second piston member 10 and the left hand portion of the body member 1, in cooperation with the small cylinder bore 4. These four chambers are arranged in the order of their reference numerals from the right to the left of the drawing.

On the left hand end of the first piston member 9 there is mounted a first piston member cap element 17, and the right hand end of the second piston member 10 is formed as a protuberance or projection. Between this protuberance or projection, and this first piston member cap element 17, there is mounted a first compression coil spring 19. At the left hand end of the small cyliner bore 4, against the left hand portion of the body member 1, there is placed the bore end cap shaped element 18, and on the left hand end of the second piston member 10 there is mounted the second piston member cap element 61. Between the bore end cap shaped element 18 and this second piston member cap element 61, there is mounted a second compression coil spring 20.

Thus, when no force is exerted, for example via a foot brake pedal of the vehicle which is adapted to be pressed by the driver, on the first piston member 9 to push it leftwards in the drawing, then, by the biasing actions of the first compression coil spring 19 and the second compression coil spring 20, the first piston member 9 is moved to its right hand position as shown in the drawing where its right hand end abuts against the retaining snap ring 16, and furthermore the second piston member 10 is moved to an intermediate position in the small cylinder bore 4, i.e., to an axial position which is determined by the balance of the spring forces of the first compression coil spring 19 and the second compression coil spring 20. These positions of the first piston member 9 and the second piston member 10 will be hereinafter termed their restored or equilibrium positions.

Around a groove in the second piston member 10 formed between the two second piston member lands 11, there is mounted a sealing O-ring 64 which is formed of a rubber like elastomeric material. This provides a two way seal between the third fluid chamber 14 and the fourth fluid chamber 15.

To the left hand side of the small piston land portion 7 of the first piston member 9 there is mounted a first seal element 33, also made of a rubber like elastomeric material, which is formed with a first sealing lip flange 32 facing to the left in the drawing. Thus, by its cooperation with the inner surface of the small cylinder bore 4, this first seal element 33 functions as a one way fluid valve, allowing hydraulic brake fluid to flow only from the second fluid chamber 13 to the third fluid chamber 14, and not in the reverse direction, through a plurality of first fluid flow holes 34 pierced through the small piston land portion 7, and past a first thrust washer 35, which is mounted between the first seal element 33 and the small piston land portion 7, and which has a certain clearance provided between it and the inner wall of the small cylinder bore 4. This fluid flow therefore passes from the second fluid chamber 13, through the first fluid flow holes 34, under, past, and around the first thrust washer 35, and past the first sealing lip flange 32 of the first seal element 33 into the third fluid chamber 14.

Further, to the left of the first large piston land portion 5 of the first piston member 9, there is similarly mounted a second seal element 29, also made of a rubber like elastomeric material, formed with a second sealing lip flange 28 which is engaged with the inner wall of the large cylinder bore 3, and which similarly functions as a one way fluid valve between the first fluid chamber 12 and the second fluid chamber 13 in the body member 1, allowing hydraulic brake fluid to flow only from the first fluid chamber 12 to the second fluid chamber 13, but not in the reverse direction, this flow occurring through a plurality of second fluid flow holes 30 and past a second thrust washer 31 which is mounted between the second seal element 29 and the first large piston land portion 5 of the first piston member 9, and past the second sealing lip flange 28. Thus, this fluid flow passes from the first fluid chamber 12, through the second fluid flow holes 30 in the first large piston land portion 5, under, past, and around the second thrust washer 31, and between a clearance provided between the second thrust washer 31 and the wall of the large cylinder bore 3, and past the second sealing lip flange 28 of the second seal element 29.

Further, just to the left of the second large piston land portion 6 of the first piston member 9, there is mounted a third seal element 27, also made of a rubber like elastomeric material, which functions as a seal, preventing escape of hydraulic brake fluid out from the first fluid chamber 12 to the right hand direction in the drawing.

These members, i.e. the sealing O-ring 64, the first seal element 33, the second seal element 29, and the third seal element 27, therefore support the second piston member 10 within the small cylinder bore 4 so as to slide therein, and also support the first piston member 9 in the small cylinder bore 4 and the large cylinder bore 3, so as to slide therein.

On the upper part of the right hand side of the body member 1 there is mounted a first hydraulic brake fluid reservoir 24, via a first mounting nut 23 screwed between it and the body member 1, and this first mounting nut 23 is pierced with a first communicating hole 25. In the body of the body member 1, between the first communicating hole 25 and the interior of the large cylinder bore 3, there are pierced two ports: an equalization port 21, which is communicated to the first fluid chamber 12 at all times when the first piston member 9 moves throughout its range of axial movement within the large cylinder bore 3 and the small cylinder bore 4, and a first replenishing port 22, which is communicated to the second fluid chamber 13, substantially, only when the first piston member 9 is at the extreme right hand end of its range of movement within the large cylinder bore 3 and the small cylinder bore 4, as shown in the drawing, and communication of which to the second fluid chamber 13 is otherwise interrupted.

Further, in the body member 1 there is provided a first hydraulic brake fluid output port 26, which is open to the third fluid chamber 14 at all times during the travel of the first piston member 9 and the second piston member 10 along their ranges of movement within the large cylinder bore 3 and the small cylinder bore 4, and which is communicated to a braking device of the vehicle, for example, to a fluid pressure actuator of a rear braking system of the vehicle, via conduits which are not shown in the figure. Further, the body member 1 is formed with a second hydraulic brake fluid output port 65, which is communicated to the fourth fluid chamber 15 at all times, as the second piston member 10 moves along its range of travel in the small cylinder bore 4. This second output port 65 is communicated, via conduits which are not shown, to another braking device of the vehicle, for example, to a fluid actuator of a front braking system of the vehicle.

Further, on the left hand end of the body member 1 there is formed a second replenishing port 55, which is open to the left hand end of the fourth fluid chamber 15, and which leads to a hole pierced through a second mounting nut 56. This second mounting nut 56 is provided for coupling a second hydraulic brake fluid reservoir 57 to the body member 1, so as to communicate hydraulic brake fluid therein to the second replenishing port 55.

The first piston member 9 is formed with an inner accumulator cylinder bore 8a within its cylindrical portion 8 along its axis, and within this accumulator cylinder bore 8a there is mounted an accumulator piston 36 which is slidable therein. Between a circumferential groove formed on the accumulator piston 36, and the inner wall of the accumulator cylinder bore 8a, there is mounted an accumulator sealing O-ring 42 made of a rubber like elastomeric material. The accumulator piston 36 is biased to its left hand position within the accumulator cylinder bore 8a of the first piston member 9 by an accumulator compression coil spring 40. The right hand end of this accumulator compression coil spring 40 bears against a screwed plug 39, which is mounted in the right hand end of the accumulator cylinder bore 8a so as to block it. This screwed plug 39 is pierced with an air purge hole 43, and is further formed on its right hand end with a hemispherical depression 44 which is adapted to receive the left hand end of an actuating plunger 45. This actuating plunger 45 is connected to, for example, a brake pedal of the vehicle, adapted to be operated by the foot of the operator, so as, when this brake pedal is depressed, to drive the first piston member 9 leftwards in the drawing.

To the left of the accumulator piston 36, by cooperation of the accumulator piston 36 and the inner surface of the accumulator cylinder bore 8a of the first piston member 9, there is defined an accumulator chamber 37. This accumulator chamber 37 is communicated to the second fluid chamber 13 via a communicating hole 38, which is bored in the wall of the accumulator cylinder bore 8a through to the outside of the first piston member 9. The accumulator compression coil spring 40, therefore, biases the accumulator piston 36 in the direction to reduce the volume of the accumulator chamber 37. The left hand end in the drawing of the accumulator piston 36 is tapered or chamfered, and is also formed with a cross shape 41, as particularly shown in FIG. 2, which is a perspective view of this end of the accumulator piston 36 and of the cross shape 41 formed thereon. The function of this cross shape 41 will be explained later.

Between the accumulator chamber 37 and the third fluid chamber 14 there is pierced a transfer hole 9a, through the first piston member 9. Thus, this transfer hole 9a communicates the second fluid chamber 13 with the third fluid chamber 14, via the communicating hole 38 and the accumulator chamber 37. The left hand end of this transfer hole 9a, in fact, opens under the first piston member cap element 17, but in the end of this cap element 17 there is pierced an end hole 17a, so as to communicate the third fluid chamber 14 with the transfer hole 9a. A first valve head 46 is mounted within the first piston member cap element 17, and a first valve rod 47 protrudes therefrom, which passes along the axis of the transfer hole 9a, the right hand end of said valve rod 47 being in contact with the left hand end of the accumulator piston 36, when the accumulator piston 36 is in its leftwardly biased position as shown in the drawing. Over the first valve rod 47, against the first valve head 46, there is mounted a first valve seal element 49 made of a rubber like elastomeric material, and between the left hand side of the first valve head 46 and the inner side of the left hand end of the first piston member cap element 17 there is mounted a first valve biasing compression coil spring 48, which biases the first valve head 46 and the first valve rod 47 to the right.

Therefore, when the accumulator piston 36 is in its leftwardly biased position by the action of the accumulator compression coil spring 40, within the accumulator cylinder bore 8a of the first piston member 9, as shown in the drawing, then its left hand end bears against the right hand end of the first valve rod 47, and thereby biases the valve head 46, against the restoring force of the first valve biasing compression coil spring 48, leftwards in the drawing with respect to the transfer hole 9a, so that the first valve seal element 49 is brought away from contact with the left hand end of the transfer hole 9a, and thereby this left hand end of the transfer hole 9a is opened. Thereby, communication is established between the second fluid chamber 13 and the third fluid chamber 14 for passing of hydraulic brake fluid therethrough, via the communicating hole 38, the cross shape 41 cut in the end of the accumulator piston member 36, the part of the transfer hole 9a around the first valve rod 47, past the first valve seal element 49, around the first valve head 46, through the interstices of the first valve biasing compression coil spring 48, and through the end hole 17a.

However, as soon as the accumulator piston 36 moves a little in the right hand direction, with respect to the first piston member 9, within the accumulator cylinder bore 8a, then this will allow the first valve rod 47 and the first valve head 46 to move in the right hand direction with respect to the wall of the transfer hole 9a, so that the first valve seal element 49 is brought into sealing contact against the left hand end of the transfer hole 9a, and interrupts the abovementioned communication, so as to isolate the second fluid chamber 13 from the third fluid chamber 14 and so as to cut off flow of hydraulic brake fluid therebetween. In accordance with this construction, the biasing force of the accumulator compression coil spring 40 is arranged to be greater than the biasing force of the first valve biasing compression coil spring 48, so that, in the absence of substantial pressure difference between the accumulator chamber 37 and the atmospheric pressure which is introduced through the air purge hole 43 into the space to the right hand side of the accumulator piston 36 within the first piston member 9, the biasing action of the accumulator compression coil spring 40 is sufficient to keep the accumulator piston 36 in its leftwardly biased position within the accumulator cylinder bore 8a, against the opposing force of the first valve biasing compression coil spring 48.

It should be particularly noted that, in the second above explained condition where the spring action of the first valve biasing compression coil spring 48 is biasing the first valve head 46 and the first valve seal element 49 against the left hand end of the transfer hole 9a so as to interrupt communication between the third fluid chamber 14 and the second fluid chamber 13, then, if hydraulic brake fluid pressure within the third fluid chamber 14 rises substantially, the biasing action of this hydraulic fluid pressure will further press harder and harder the first valve head 46 and the first valve seal element 49 against the left hand end of the transfer hole 9a. This provides a fail safe characteristic to the brake master cylinder device according to the present invention.

The second replenishing port 55, which as explained above opens to the left hand end of the fourth fluid chamber 15, is selectively opened and closed by a second valve 58 which is provided within the bore end cap shaped element 18 which, as previously explained, is mounted at the left hand end of the small cylinder bore 4 formed in the body member 1. The second valve 58 is constructed as comprising a second valve rod 59 which is formed at its right hand end with a valve rod stop 60 which can engage with the inner side of the second piston member cap element 61 which, as previously explained, is mounted on the left hand end of the second piston member 10. A second valve seal element 63, made of a rubber like elastomeric material, is mounted on the second valve 58, so as to provide sealing action for the second replenishing port 55. The second valve 58 is so constructed that, when the second piston member 10 is in its restored or equilibrium position as shown in the drawing, then the second piston member cap shaped element 61 mounted thereon pulls to the right in the drawing the second valve rod 59 by the valve rod stop 60 mounted thereon, so as to displace the second valve 58 away from the second replenishing port 55, and so as to provide communication between the second replenishing port 55 and the fourth fluid chamber 15. However, when the second piston member 10 and the second piston member cap element 61 mounted thereon start to move in the left hand direction within the small cylinder bore 4 of the body member 1, then the second piston member cap element 61 reaches the valve rod stop 60 so that the second valve rod 59 of the second valve 58 is allowed to move slightly to the left in the direction, so as positively to close the second valve 58, and thereby to interrupt communication between the second replenishing port 55 and the fourth fluid chamber 15. A second valve compression disk spring 62 is provided between the valve 58 and the inner side of the bore end cap shaped element 18, so as to bias the valve 58 in this closing direction to close the port 55.

The operation of the brake master cylinder device explained above according to the present invention may be summarized as follows.

When the brake pedal of the vehicle is not depressed, then the actuating plunger 45 provides no biasing action to the first piston member 9 in the left hand direction in the drawing, and, therefore, the first piston member 9 and the second piston member 10 are in their restored positions as shown in the drawing, and the first fluid chamber 12 is connected, via the equalization port 21, to the hydraulic brake fluid in the interior of the first hydraulic brake fluid reservoir 24 via the first communicating hole 25 in the first mounting nut 23, and is substantially at atmospheric pressure; the second fluid chamber 13 is communicated via the first replenishing port 22 and the first communicating hole 25 to the hydraulic brake fluid in the interior of the first hydraulic brake fluid reservoir 24, and is also at substantially atmospheric pressure; the third fluid chamber 14 is communicated, via the end hole 17a, the transfer hole 9a, the cross shape 41 on the end of the accumulator piston 36, the accumulator chamber 37, and the communicating hole 38, to the second fluid chamber 13, and is therefore also substantially at atmospheric pressure; and the fourth fluid chamber 15 is communicated, via the second valve 58 and the second replenishing port 55 and the hole in the second mounting nut 56, to the hydraulic brake fluid stored in the second hydraulic brake fluid reservoir 57, and is also substantially at atmospheric pressure.

Now, when the brake pedal of the vehicle is depressed by the foot of an operator, the actuating plunger 45 moves to the left in the drawing, thereby pressing the first piston member 9, via the screwed plug member 39, to the left in the drawing. Almost immediately, as soon as the first piston member 9 moves, the communication between the first replenishing port 22 and the second fluid chamber 13 is interrupted. As the first piston member 9 moves to the left in the large cylinder bore 3 and the small cylinder bore 4, against the biasing spring force of the first compression coil spring 19 and the second compression coil spring 20, then, because of the difference in the diameters of the large cylinder bore 3 and the small cylinder bore 4, and because of the associated difference in the cross sectional areas thereof, the volume of the second fluid chamber 13 will progressively decrease. The hydraulic brake fluid within the second fluid chamber 13 cannot escape through the first replenishing port 22 to the first hydraulic brake fluid reservoir 24, because the communication of the first replenishing port 22 to the second fluid chamber 13 is closed off by the second seal element 29, and accordingly this hydraulic brake fluid is forced through the communicating hole 38, into the accumulator chamber 37, past the cross shape 41 formed on the end of the accumulator piston 36, through the transfer hole 9a, past the first valve seal element 49 and the first valve head 46, and out of the first piston member cap element 17 through its end hole 17a into the third fluid chamber 14. Also, a certain quantity of this hydraulic fluid is driven through the fluid flow holes 34 formed in the small piston land portion 7, past the first thrust washer 35, and past the aforementioned one way valve comprising the first seal member 33 and the sealing lip flange 32 thereof, into the second fluid chamber 14. This flow path is in parallel to the path through the the transfer hole 9a. Further, as soon as the second piston member 10 has moved a little to the left in the drawing, the valve rod stop 60 is released from engagement with the second piston member cap element 61, as explained above, and the second valve rod 59 moves a little to the left in the drawing, thereby closing the second valve 58 and interrupting communication between the second replenishing port 55 and the fourth fluid chamber 15. Thus, as the first piston member 9 and the second piston member 10 both move further to the left in the drawing, the second piston member 10 being balanced between the hydraulic fluid pressures in the third fluid chamber 14 and the fourth fluid chamber 15, and between the spring actions of the first compression coil spring 19 and the second compression coil spring 20, the hydraulic brake fluid within the third fluid chamber 14 will be driven out through the first output conduit 26, and the hydraulic brake fluid within the fourth fluid chamber 15 will be driven out through the second output conduit 65, so as to operate the respective hydraulic fluid pressure actuated brake systems connected to this first output conduit 26 and to this second output conduit 65, in a balanced manner.

It should be particularly noted that, according to the present invention, the amount of hydraulic brake fluid that is expelled from the combination of the second fluid chamber 13 and the third fluid chamber 14 through the first output conduit 26 to operate the particular hydraulic brake fluid pressure actuated braking system coupled to this first output conduit 26, such as the rear braking system of the vehicle, at this time, is governed by the square of the internal diameter of the large cylinder bore 3, and is not related to the internal diameter of the small cylinder bore 4, and this hydraulic brake fluid is accordingly provided in a relatively large amount, per unit amount of travel of the first piston member 9. Thus, the braking system coupled to the first output conduit 26 is actuated in a relatively quick fashion by this large amount of hydraulic brake fluid supplied thereto. In accordance with this operation, relative to the amount of pressure applied by the foot of the driver to the braking pedal of the vehicle, i.e., relative to the amount of pressure exerted by the actuating plunger 45 on the screwed plug member 39 on the right hand end of the first piston member 9, the pressure of the hydraulic brake fluid expelled through the first output port 26 to the hydraulic brake fluid pressure actuated braking system connected thereto is relatively low. However, in the initial stages of taking up the slack in this braking system, this will be quite acceptable.

In a per se well known fashion, the hydraulic brake fluid expelled from the fourth fluid chamber 15 through the second output port 65 is sent to the other hydraulic fluid pressure operated braking system connected to this second output port 65, for example, to the front braking system of the vehicle. The arrangements for supplying fluid pressure from the second hydraulic brake fluid reservoir 57, via the second replenishing port 55 and the fourth fluid chamber 15, and via the second output port 65, to this front braking system, as controlled by the second piston member 10, do not practice the present invention; they are per se well known and conventional. Thus, over the entire stroke of the second piston member 10 within the small cylinder bore 4, the amount of hydraulic brake fluid expelled from the fourth fluid chamber 15 through the second output port 65 to the braking system associated therewith is substantially constant, per unit amount of displacement of the second piston member 10.

As explained above, during this first phase of the motion of the first piston member 9 within the body member 1 to the left, the deciding factor with regard to the amount of hydraulic brake fluid expelled through the first output port 26 to the rear braking system of the vehicle, per unit amount of movement of the first piston member 9, is the square of the internal diameter of the large cylinder bore 3, and accordingly a proportionally large amount of hydraulic brake fluid will be expelled through the first output port 26, in relation to the amount of movement of the first piston member 9. This is because the second fluid chamber 13 is in communication with the third fluid chamber 14, via the communicating hole 38, the accumulator chamber 37, the transfer hole 9a, past the first valve seal element 49, and through the end hole 17a, and also via the above described alternative parallel path, through the fluid flow holes 34 formed in the small piston land portion 7, past the first thrust washer 35, and past the aforementioned one way valve comprising the first seal member 33 and the sealing lip flange 32.

However, when the hydraulic braking system connected to the first hydraulic brake fluid output port 26 engages, so as to apply more and more pressure to a braking element such as a brake pad or a brake shoe, then the pressure in the third fluid chamber 14, and the second fluid chamber 13 communicated therewith, will start to rise substantially. As more pressure is applied by the foot of the driver of the vehicle to the brake pedal thereof, and more pressure is applied by the actuating plunger 45 to the right hand end of the first piston member 9, therefore, the hydraulic brake fluid pressure within the second fluid chamber 13, the accumulator chamber 37, and the third fluid chamber 14 will continue to rise substantially. When this hydraulic brake fluid pressure reaches a certain predetermined value, which is determined by the balance of the spring pressures of the accumulator compression coil spring 40 and the first valve biasing compression coil spring 48, and by the area of the left hand end of the accumulator piston 36, then the accumulator piston 36 will start to move to the right with respect to the first piston member 9, compressing the accumulator compression coil spring 40, and enlarging the volume of the accumulator chamber 37.

As soon as the accumulator piston 36 starts thus to move within the first piston member 9, its left hand end allows the first valve rod 47 to move slightly to the right with respect to the walls of the transfer hole 9a, thus allowing the first valve head 46 and the first valve seal element 49 to be clamped against the left hand end of the transfer hole 9a by the spring action of the first valve biasing compression coil spring 48, thereby interrupting the communication of the transfer hole 9a with the interior of the first piston member cap element 17. Thereby, flow of fluid from the second fluid chamber 13 to the third fluid chamber 14 is immediately interrupted, because, as explained above, the assembly incorporating the first seal element 33 functions as a one way valve, allowing flow of fluid past it from the second cylinder chamber 13 to the third cylinder chamber 14, but not in the reverse direction, from the third cylinder chamber 14 to the second cylinder chamber 13.

From this condition, as the first piston member 9 is displaced further to the left within the large cylinder bore 3 and the small cylinder bore 4 by further increase of pressure of the foot of the operator of the vehicle upon the brake pedal thereof, the hydraulic brake fluid pressure within the second fluid chamber 13 does not substantially increase very much further, because the diminution in the volume of the second fluid chamber 13, caused by the difference in the diameters of the large cylinder bore 3 and the small cylinder bore 4, and the associated difference in the cross sectional areas thereof, drives hydraulic brake fluid out of the second fluid chamber 13, through the communicating hole 38, and into the accumulator chamber 37, which enlarges to accomodate this displaced hydraulic brake fluid, by motion of the accumulator piston 36 to the right within the first piston member 9 against the biasing action of the accumulator compression coil spring 40. Thereby, further very substantial compression of hydraulic brake fluid within the diminishing volume of the second fluid chamber 13 is prevented, by the accomodation of this excess hydraulic brake fluid within the enlarging accumulator chamber 37.

Because the valve comprising the first valve head 46 and the first valve seal element 49 is pressed against the left hand end of the transfer hole 9a, and is closed, the flow of fluid from the third fluid chamber 14 to the second fluid chamber 13 is positively interrupted, and, accordingly, the third fluid chamber 14 is now functioning as a brake master cylinder chamber on its own, without reference to the second fluid chamber 13, and, as the volume of this third fluid chamber 14 is decreased by the differential movement between the first piston member 9 and the second piston member 10, hydraulic brake fluid continues to be expelled through the first output conduit 26 to the rear braking system associated with this first output conduit 26, in an amount, relative to the differential motion between the first piston member 9 and the second piston member 10, which is determined by the square of the diameter of the small cylinder bore 4 formed in the body member 1, and by its associated cross sectional area, without any reference to the diameter of the large cylinder bore 3. Because the diameter of this small cylinder bore 4 is substantially smaller than the diameter of the large cylinder bore 3, the amount of hydraulic brake fluid expelled through the first output port 26, per unit amount of displacement of the first piston member 9 within the large cylinder bore 3 and the small cylinder bore 4, is substantially smaller than was previously the case, when the valve comprising the first valve head 46, the first valve seal element 49, and the left hand end of the transfer hole 9a was open. Accordingly, the mechanical advantage obtained by the brake master cylinder device according to the present invention is greater in this operational condition, and less force is required to be exerted by the driver of the vehicle upon the brake pedal thereof, than would be the case in a prior art master cylinder device, in order to operate the rear brakes of the vehicle.

If we designate the force required to move the first piston member 9 in the left hand direction as F, the pressure receiving area of the first large piston land portion 5 of the first portion member 9 as $A_1$, the pressure receiving area of the small piston land portion 7 of the first piston member 9 as $A_2$, the fluid pressure in the second fluid chamber 13 as $P_1$, the fluid pressure in the third fluid chamber 14 as $P_2$, and the spring force of the first compression coil spring 19 as f, then the force P may be derived from the following equation.

$$F = P_1(A_1 - A_2) + P_2 A_2 + f$$

Therefore, since the rise in the hydraulic brake fluid pressure $P_1$ within the second fluid chamber 13 is restricted, and does not increase very substantially, beyond the pressure at which the accumulator chamber 37 starts to increase in size by the accumulator piston 36 moving to the right within the accumulator cylinder bore 8a in the first piston member 9 against the force of the accumulator compression coil spring 40, and since the pressure receiving area $A_2$ of the small piston land portion 7, which compresses fluid in the final stage of brake operation wherein almost all of the mechanical clearance in the brake system has been cancelled and no more fluid is required, may be very small, even when the rise in the hydraulic brake fluid pressure $P_2$ within the third fluid chamber 14 is much greater than is the rise in this pressure $P_1$, the force F required for this operation remains small, as compared to what it would be in a prior art brake master cylinder system. Accordingly, the first piston member 9, as it is driven further to the left from the position at which the valve comprising the first valve head 46, and the first valve seal element 49, and the left hand end of the transfer hole 9a closes, does not require very much force for being driven.

Thus, fluid pressure is supplied to the front braking system connected to the second output port 65 and to the rear braking system connected to the first output port 26. When it is desired to relieve this braking action, then the driver of the vehicle removes his foot from the brake pedal thereof, and, accordingly, the actuating plunger 45 ceases to exert pressure on the first piston member 9, and accordingly under the restoring spring forces of the first compression coil spring 19 and the second compression coil spring 20, the first pinion member 9 and the second piston member 10 start to move towards their restored or equilibrium positions. Thereby, hydraulic brake fluid flows from the front braking system of the vehicle through the conduits connected thereto, through the second output port 65, and into the fourth fluid chamber 15, and hydraulic brake fluid flows from the rear braking system of the vehicle, through the conduits connected thereto, through the first output port 26, and into the third fluid chamber 14. Further, at this time, as the first piston member 9 moves to the right within the large cylinder bore 3 and the small cylinder bore 4, the accumulator piston 36 is meanwhile moving to the left within the accumulator cylinder bore 8a of the first piston member 9, thus diminishing the size of the accumulator chamer 37 and expelling hydraulic brake fluid therefrom through the communicating hole 38 into the second fluid chamber 13, in correspondence to the motion of the first piston member 9 to the right within the body member 1, and in correspondence to the difference in the squares of the diameters of the large cylinder bore 3 and the small cylinder bore 4, and to the associated difference in the cross sectional areas thereof.

When the accumulator piston 36 has returned to its initial or restored position within the accumulator cylinder bore 8a of the first piston member 9, i.e., when it is at the left hand end of the accumulator cylinder bore 8a, then it presses against the right hand end of the first valve rod 47, thereby displacing the first valve head 46 and the first valve seal element 49 from the left hand end of the transfer hole 9a, and communicating this transfer hole 9a with the third fluid chamber 14, via the end hole 17a and the chamber within the first piston member cap element 17. Thereby, as the first piston member 9 further moves to the right hand direction within the body member 1, by this communication, a part of the hydraulic brake fluid which is being returned to the third fluid chamber 14 via the first output port 26 is returned to the second fluid chamber 13, via the end hole 17a, past the first valve head 46 and the first valve seal element 49 into the left hand end of the transfer hole 9a, through the transfer hole 9a, pastthe cross shape 41 formed on the end of the accumulator piston member 36, through the accumulator chamber 37, through the communicating hole 38, and into the second fluid chamber 13. Further, if at this time the fluid transfer capacity of this transfer path comprising the transfer hole 9a, etc., is inadequate promptly to supply sufficient fluid for maintaining the pressure within the second fluid chamber 13 at approximately at least atmospheric pressure, then brake fluid will flow from the first fluid chamber 12, which is at substantially atmospheric pressure because it is always communicated to the fluid reservoir 24 via the equalization port 21, to the second fluid chamber 13, through the aforementioned one way valve between these chambers, comprising the second seal element 29; in other words, through the second fluid flow holes 30 in the first large piston land portion 5, under, past, and around the second thrust washer 31, and between the clearance provided between the second thrust washer 31 and the wall of the large cylinder bore 3, and past the second sealing lip flange 28 of the second seal element 29, by deflecting this second sealing lip flange 28 away from the wall of the large cylinder bore 4. Accordingly, under pressure below atmospheric pressure cannot occur within the second fluid chamber 13.

As an overall result of this, the braking effect applied to the rear braking system of the vehicle is smoothly relieved. Further, in a per se conventional fashion, when the first piston member 9 finally reaches its rightmost position within the large cylinder bore 3 and the small cylinder bore 4, the first replenishing port 22 is communicated with the second fluid chamber 13, and, if any slight amount of hydraulic brake fluid has escaped from the rear braking system of the vehicle, or for any other reason any slight under pressure exists within the second fluid chamber 13 and the third fluid chamber 14, then supply of hydraulic brake fluid from the first hydraulic brake fluid reservoir 24 through the first communicating hole 25 and the first replenishing port 22 will supply this deficiency.

Further, in a per se conventional fashion, when the second piston member 10 has fully reached its restored position within the small cylinder bore 4, it displaces the valve rod stop 60 and the second valve rod 59 to the right in the drawing, so as to open the second valve 58, and so as to communicate the second hydraulic brake fluid reservoir 57, via the hole in the second mounting nut 56 and the second replenishing port 55, with the fourth fluid chamber 15, thereby, similarly, replenishing the fourth fluid chamber 15, and supplying additional hydraulic brake fluid thereto, to compensate for any slight leakage that may have occurred from the front braking system of the vehicle, or any under pressure which otherwise may exist in the fourth fluid chamber 15.

Figure 2:
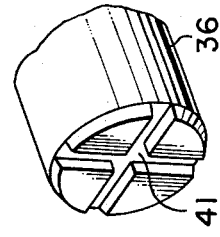
FIG. 2 is a perspective view of the end portion of an accumulator piston which is incorporated in the brake master cylinder device shown in FIG. 1, showing a cross shaped groove arrangement thereon.
Figure 3:
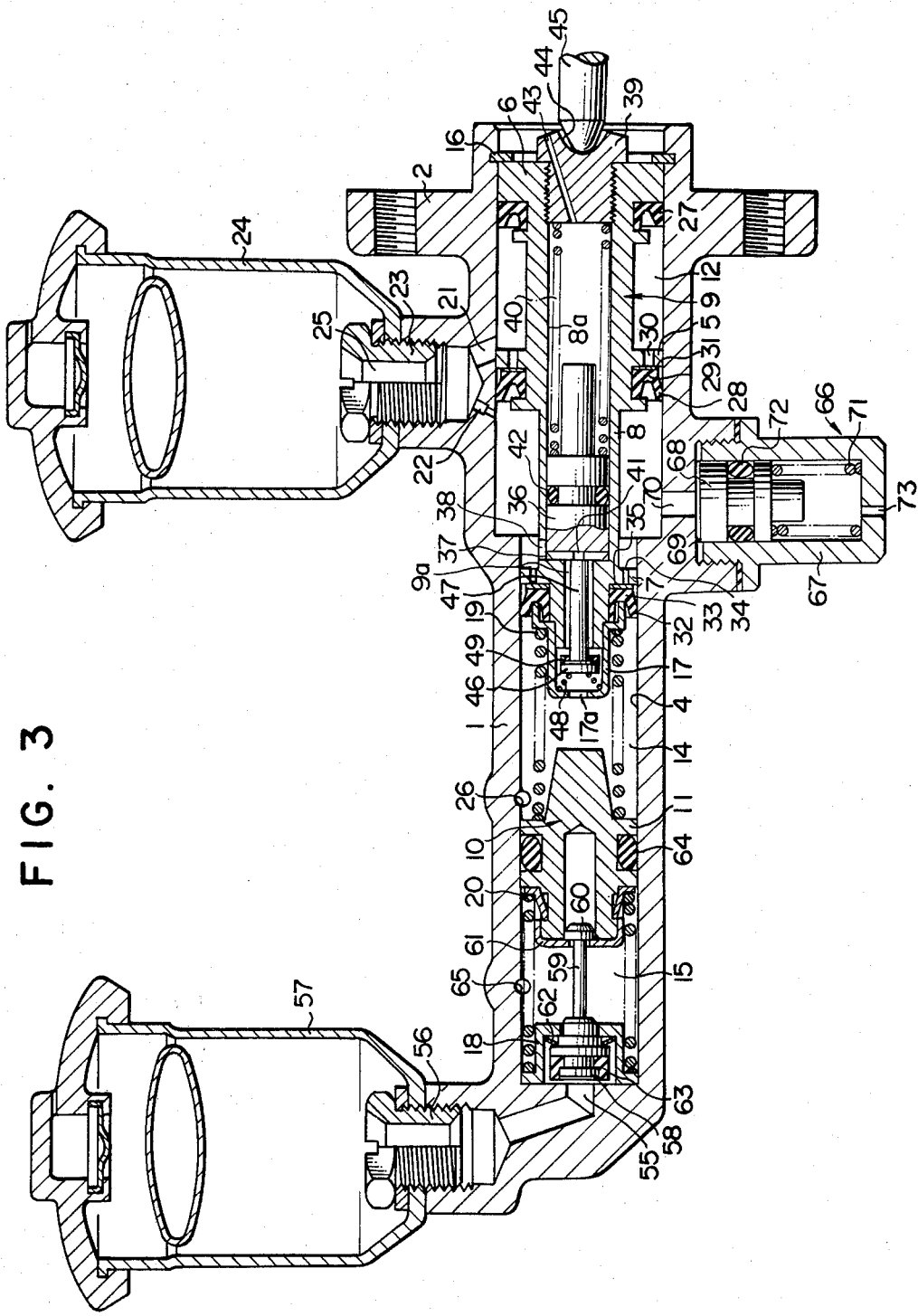
FIG. 3 is a vertical cross sectional view taken along the axis of a brake master cylinder device which is a second preferred embodiment of the present invention, which is similar to the brake master cylinder device shown in FIGS. 1 and 2, but which further includes an external accumulator.

FIG. 3 shows a second preferred embodiment of the present invention. In this figure, parts which correspond to parts of the first embodiment, shown in FIGS. 1 and 2, and which have the same functions, are designated by the same reference numerals as in those figures.

The construction of the brake master cylinder device according to the embodiment of FIG. 3 is essentially the same as that of the first embodiment, except that, in addition to the accumulator system provided by the accumulator chamber 37, etc., which is provided within the first piston member 9, there is provided a further accumulator system for hydraulic brake fluid which requires to be expelled from the second fluid chamber 13, due to the reduction in the volume thereof, when the valve comprising the first valve head 46, the first valve seal element 49, and the left hand end of the transfer hole 9a has been closed by the initial displacement of the accumulator piston 36 rightwards within the accumulator cylinder bore 8a of the first piston member 9. This additional accumulating system includes an accumulator feed hole 70 which leads out from the second fluid chamber 13 downwards in the figure to an auxiliary accumulator 66, which comprises a auxiliary accumulator casing 67 which is screwed into a female screwed portion provided on the lower part of the master cylinder body member 1. An auxiliary accumulator piston 68 is mounted slidably within the auxiliary accumulator casing 67, and in a groove on the auxiliary accumulator piston 68 there is fitted an auxiliary accumulator sealing O-ring 72, between it and the auxiliary accumulator casing 67, to seal therebetween. At the bottom of the auxiliary accumulator casing 67 there is provided an air vent hole 73, and between the bottom of the auxiliary accumulator casing 67 and the lower part of the auxiliary accumulator piston 68 there is provided an auxiliary accumulator compression coil spring 77, which biases the auxiliary accumulator piston 68 upwards in the drawing. Thus, above the auxiliary accumulator piston 68, there is defined an auxiliary accumulator chamber 69, which is communicated through the aforesaid accumulator feed hole 70 to the second fluid chamber 13.

In a manner similar to the operation of the accumulator system comprising the accumulator piston 36, the accumulator chamber 37, the accumulator compression coil spring 40, etc., this auxiliary accumulator 66 accommodates excess hydraulic brake fluid that is driven out of the second fluid chamber 13, when the communication between the second fluid chamber 13 and the third fluid chamber 14 is interrupted, due to the closing of the valve comprising the first valve head 46, the first valve seal element 49, the left hand end of the transfer hole 9a, etc. However, since the auxiliary accumulator 66 is not coupled to the opening and shutting action of the above mentioned valve, it is essential that the auxiliary accumulator 66 should not start to accumulate hydraulic brake fluid, until the abovementioned valve is closed; in other words, it is essential that the biasing action of the compression coil spring 71 should be sufficiently strong for the auxiliary accumulator piston 68 not to commence its downward travel in response to hydraulic brake fluid pressure communicated through the accumulator feed hole 70 thereto, until the accumulator piston 36 has already substantially commenced its travel rightwards within the accumulator cylinder bore 8a of the first piston member 9, in response to hydraulic brake fluid pressure transmitted through the communicating hole 38 to the accumulator chamber 27. That is to say, it is essential that the accumulating action of the accumulator auxiliary accumulator 66 should not commence, during the movement leftwards of the first piston member 9 within the body member 1, until well after the accumulating action of the accumulator comprising the accumulator chamber 37, the accumulator piston 36, etc., has commenced. If this is not the case, and if the auxiliary accumulator 66 commences its accumulating action before the valve comprising the first valve head 46, the first valve seal element 49, and the left hand end of the transfer hole 9a has closed, a disastrous failure of braking action of the brake master cylinder device of the second preferred embodiment shown in FIG. 3 might occur.

The advantage of the second preferred embodiment of the brake master cylinder device according to the present invention shown in FIG. 3 is that the total volume available for accumulation of hydraulic brake fluid, after the valve comprising the first valve head 46, the first valve seal element 49, etc., has closed, is greater than was the case in the first embodiment.

Figure 4:
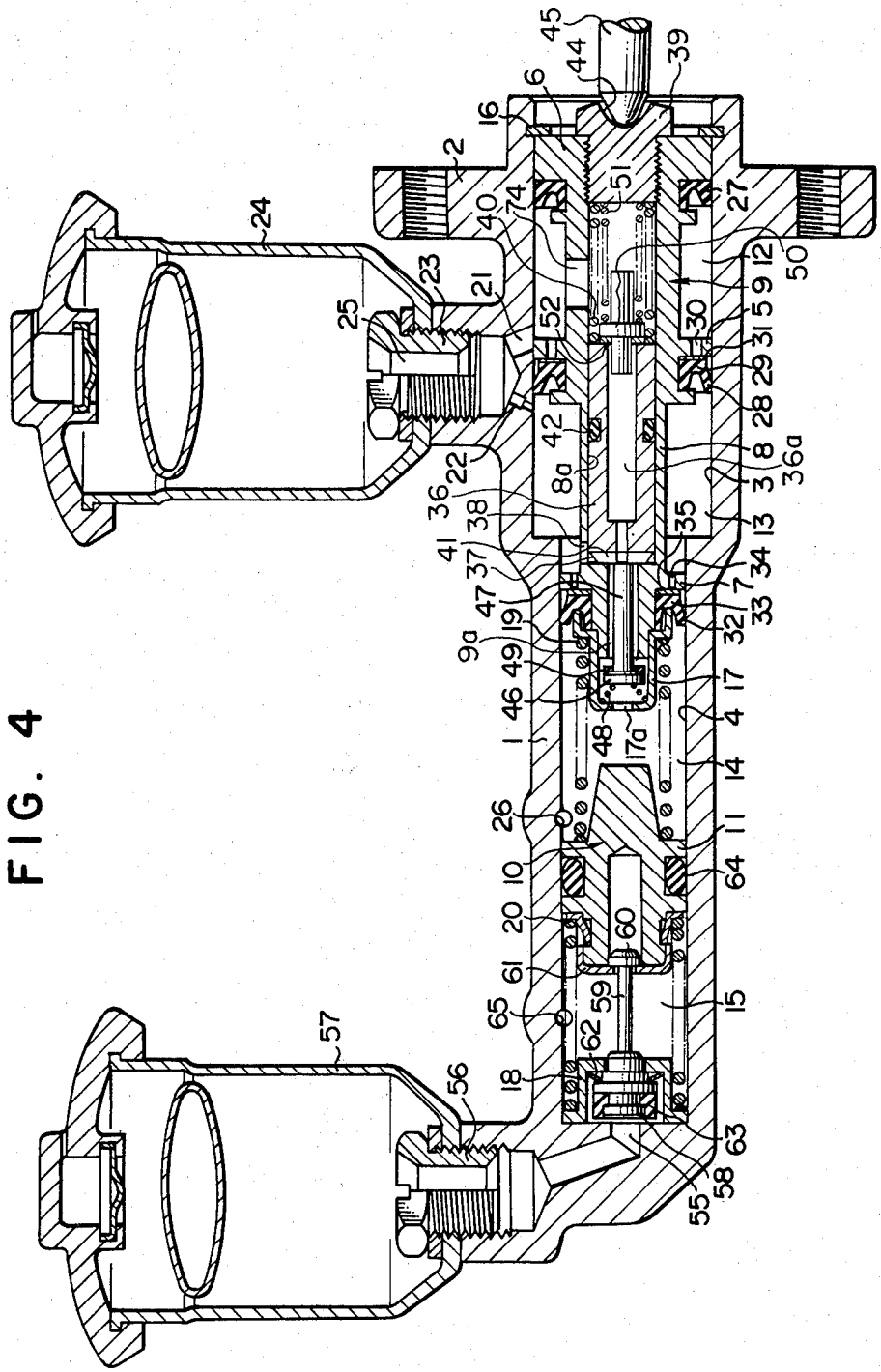
FIG. 4 is a vertical cross sectional view taken along the axis of a brake master cylinder which is a third preferred embodiment of the present invention, which is similar to the first preferred embodiment shown in FIG. 1, but in which, further, an accumulator chamber defined within the piston member is vented to a fluid reservoir, when the fluid pressure therein becomes sufficiently high.

In FIG. 4, a third preferred embodiment of the brake master cylinder device according to the present invention is shown. In this figure, parts which correspond to parts of the already described first and second embodiments of the present invention, shown in FIGS. 1 and 3, and which have the same functions, are designated by the same reference numerals as in those figures.

In this third preferred embodiment, the general construction of the body member 1, with the large cylinder bore 3 and the small cylinder bore 4 formed therein, with the first piston member 9 formed with the first and second large piston lands 5 and 6 and the small piston land 7, engaged respectively with the large cylinder bore 3 and the small cyliner bore 4, and with the second piston member 10 formed with the small piston lands 11 engaged with the small cylinder bore 4, is the same as in the first two preferred embodiments shown. The construction of the valve arrangement at the left hand end of the first piston member 9 is the same as in the above described first and second embodiments of the brake master cylinder device according to the present invention. Further, the arrangement of the hole 25 through the mounting nut member 23 of the brake fluid reservoir 24, and of the equalization part 21 and the first replenishing port 22, is the same as in the preceding embodiments, as is the valve arrangement at the left hand end of the fourth fluid chamber 15 for replenishing the fourth fluid chamber 15 with brake fluid from the second fluid reservoir 57, via the second equalization port 55. Also, particularly, the one way valve arrangements including the first seal element 33 with its sealing lip flange 32, and the second seal element 29 with its sealing lip flange 28, are as previously described.

Further, within the first piston member 9 there is formed an accumulator cylinder bore 8a within its cylindrical portion 8, as in those previous embodiments; and within this accumulator bore 8a there is slidably fitted an accumulator piston 36, and in a circumferential groove on the outside surface of this accumulator piston 36 there is mounted a sealing O-ring 42, for providing a fluid seal between the accumulator piston 36 and the cylinder bore 8a.

Figure 5:
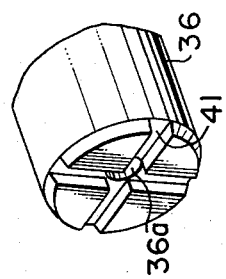
FIG. 5 is a perspective view, similar to FIG. 2, showing the end portion of an accumulator piston which is incorporated in the brake master cylinder device shown in FIG. 4, showing a cross shaped groove arrangement thereon, and a through hole along the axis thereof.

However, this accumulator piston 36 is not formed as were the accumulator pistons of the two previously shown embodiments, but is formed as particularly shown in FIG. 5, i.e. with a cross shape 41 on its left hand end as seen in the figures, and with an axial through hole 36a bored along its central axis. This axial through hole 36a opens to the right hand end in the figure of the accumulator piston 36, and the opening and closing of this right hand end of the axial hole 36a is controlled by a valve element 50. The valve element 50 is biased leftwards in the drawing by a compression coil spring 51, so that, via a seal element 52, it abuts against said right hand end of the axial hole 36a of the accumulator piston 36, and blocks it. The right hand portion of the valve element 50, and the compression coil spring 51, are housed within the central space within the compression coil spring 40, which, as in the previous embodiments, is provided for biasing the accumulator piston 36 in the left hand direction in the figure within the cylinder bore 8a, so as to reduce the volume of the accumulator chamber 37 defined by the left hand end surface of the accumulator piston 36, the inside circumferential surface of the cylinder bore 8a, and the left hand end of the cylinder bore 8a, said accumulator chamber 37 being, as in the previous embodiments, communicated via the hole 38 to the second fluid chamber 13.

Further, in contrast to the preceding embodiments shown, the space defined within the first piston member 9 to the right of the right hand end of the accumulator piston 36, within which the compression coil springs 40 and 51 and the right hand portion of the valve element 50 are housed, is communicated, via a hole 74, to the interior of the first fluid chamber 12, which is as in the preceding embodiments communicated via the equalization port 21 and the hole 25 in the mounting nut member 23 to the interior of the brake fluid reservoir 24, at all times during the movement of the first piston member 9 within the large cylinder bore 3 and the small cylinder bore 4, and which is therefore always at substantially atmospheric pressure.

Particularly according to a particular feature of this embodiment, it is so arranged that the critical fluid pressure value which is required to be present within the axial hole 36a through the accumulator piston 36, in order to displace the valve element 50 away from the right hand end of this axial hole 36a against the compression force of the compression coil spring 51, which will be hereinafter termed the second predetermined critical pressure value, is substantially greater than the critical fluid pressure value, which is required to be present within the accumulator chamber 37 defined on the left hand side of the accumulator piston 36, in order to start the accumulator piston 36 moving rightwards within the cylinder bore 8a formed within the first piston member 9 against the compression force of the compression coil spring 40, so as to commence the accumulation within the accumulator chamber 37 of fluid from within the second fluid chamber 13, and further so as to allow the rod member 47 to move to the right in the figure under the biasing action of the compression coil spring 48 so that the first valve head 46 is biased against the left hand end of the through hole 9a formed through the left hand end portion of the first piston member 9, which will hereinafter be termed the second predetermined critical pressure value.

The operation of this third preferred embodiment of the brake master cylinder device according to the present invention is as follows.

When the actuating plunger 45 is not biasing the first piston element 9 leftwards in the drawing, then, as in the previous embodiments, the first piston member 9 and the second piston member 10 are in their restored positions, under the action of the compression coil springs 19 and 20, and brake fluid at substantially atmospheric pressure is supplied to the first, the second, the third, and the fourth fluid chambers 12, 13, 14, and 15, through, respectively, the equalization port 21, the first replenishing port 22, the first replenishing port 22 and the through hole 9a, and the second replenishing port 55. When, from this condition, the driver of the vehicle applies force to the braking member thereof so as to push the first piston member 9, via the actuating plunger 45, leftwards in the drawing, then immediately, as soon as the first piston member 9 has moved a little, the second fluid chamber 13 is cut off from supply of brake fluid from the fluid reservoir 24, by the second sealing lip flange 28 of the second seal member 29 passing the first replenishing port 22.

From this position, as in the previous embodiments, according to the difference in the cross sectional areas of the large cylinder bore 3 and the small cylinder bore 4, the volume of the second fluid chamber 13 progressively decreases, as the first piston member 9 is pushed leftwards in the drawing, and accordingly fluid which is being compressed in this second cylinder chamber 13 is forced through the hole 38 into the accumulator chamber 37, which so far is still at its minimum volume, is forced via the cross shaped grooves 41 on the end of the accumulator piston 36, so as to be communicated to the left hand end of the through hole 9a formed in the left hand end of the first piston member 9, and is forced through this through hole 9a, past the valve head 46 and the sealing member 49 mounted thereon, which are at the present time displaced away from the left hand end of the through hole 9a by the accumulator piston 36 which is currently pressing against the right hand end of the valve rod 47, and is forced through the hole 17a on the end of the cap element 17 into the third fluid chamber 14. Further, in the event that the fluid flow through this fluid path is not sufficient, some brake fluid will also be forced from the second chamber 13 to the third chamber 14, through the fluid flow holes 34 formed in the small piston land portion 7 of the first piston member 9, around the thrust washer 35, and past the first sealing lip flange 32 of the first seal element 33, which is thereby flexed away from the wall of the small cylinder bore 4.

This performance of compressing brake fluid, in which the master cylinder device, as a whole, with respect to the amount of brake fluid expelled through the first fluid conduit 26, per a given amount of movement of the first piston member 9, functions with an effective brake master cylinder diameter which is the diameter of the large cylinder bore 3, continues, as in the previous embodiments shown, until the pressure within the second fluid chamber 13 reaches said first predetermined critical pressure value, which starts the accumulator piston 36 moving rightwards within the cylinder bore 8a formed within the first piston member 9. At this time, the valve comprising the valve element 50 is still blocking the right hand end of the axial hole 36a formed within the accumulator piston 36, because, as mentioned above, the aforesaid second predetermined critical pressure value for opening this valve is greater than the aforesaid first predetermined pressure value. Accordingly, as in the previous embodiments, the accumulator piston 36 moves rightwards within the accumulator bore 8a, so as to allow the valve comprising the valve head 46 to close so as to interrupt communication of the second fluid chamber 13 with the third fluid chamber 14 via the through hole 9a formed in the first piston member 9, and so that the accumulator chamber 37 commences to accumulate excess fluid which is being compressed within the second fluid chamber 13 due to the continued motion of the first piston member 9 leftwards in the drawing.

This accumulator action of the accumulator piston 36 within the first piston member 9 continues, as the accumulator piston 36 moves progressively rightwards with respect to the first piston member 9 within the accumulator bore 8a, but since the compression force of the compression coil spring 40 increases as it becomes more compressed, the pressure within the second fluid chamber 13 and the accumulator chamber 37 defined at the left hand end of the accumulator piston 36 and within the axial hole 36a of the accumulator piston 36 which is communicated therewith, gradually increases, till it reaches the aforesaid second predetermined critical pressure value at which the valve element 50 is biased away from the right hand end of the axial hole 36a against the compression action of the compression coil spring 51. At this time, fluid which is being compressed within the second fluid chamber 13 and the accumulator chamber 37 is forced through the axial hole 36a in the accumulator piston 36, past the sealing member 52 and the valve element 50, into the space within the first piston member 9 to the right of the accumulator bore 8a, and out through the hole 74 to the first fluid chamber 12, whence it is returned, via the equalization port 21 and the hole 25 in the mounting nut member 23, to the fluid reservoir 24. Accordingly, by this venting action, the fluid pressure within the second fluid chamber 13 and the accumulator chamber 37 is definitely restricted, so that it cannot rise above said second predetermined critical pressure value at which the valve comprising the valve element 50 starts to pass brake fluid.

The operation of the fourth fluid chamber 15 and the second piston member 10, as providing brake fluid via the second output conduit 65, etc., is the same as in the first and second embodiments, and will not be further discussed.

It is particularly important that the aforementioned second predetermined critical pressure value at which the valve comprising the valve element 50 starts to operate and to vent fluid from the second fluid chamber 13 and the accumulator chamber 37 to the first fluid chamber 12 and back to the fluid reservoir 24, should be substantially higher than the first predetermined critical fluid pressure value at which the accumulator piston 36 starts to move rightwards within the accumulator bore 8a, thus allowing the valve comprising the first valve head 46 to close, because, if this second predetermined critical pressure value should by any chance be less than the first predetermined critical fluid pressure value, then the valve comprising the valve element 50 would open before the valve comprising the valve head 46 has closed, and accordingly pressure within the third fluid chamber 14 would be vented through the axial hole 36a in the accumulator piston 36 to the fluid reservoir 24, thus causing a disastrous failure of braking action of the brake master cylinder device.

Now, after the required braking action for the vehicle has been completed, when the driver removes his foot from the brake pedal thereof, so as to release braking action, then the plunger 45 ceases to impel the first piston member 9 leftwards in the figure, and accordingly, under the actions of the compression coil springs 19 and 20, the first piston member 9 and the second piston member 10 start to move rightwards in the figure, towards their restored positions. Thus, brake fluid starts to flow back through the first conduit 26 into the third fluid chamber 14, and through the second fluid conduit 65 into the fourth chamber 15. Further, almost immediately the fluid pressure within the second fluid chamber 13 drops to below the second predetermined critical fluid pressure value, so that the valve element 50 is biased leftwards by the compression coil spring 51 so as to block, via the seal element 52, the right hand end of the through hole 36a in the accumulator piston 36, and so as thereby to isolate the first fluid chamber 12 from the accumulator chamber 37 and from the second fluid chamber 13.

From this condition, as the second fluid chamber 13 increases in volume according to the displacement rightwards in the drawing of the first piston member 9 within the large cylinder bore 3 and the small cylinder bore 4, the accumulator chamber 37 progressively decreases in size by the movement of the accumulator piston 36 leftwards in the figure with respect to the first piston member 9 within the cylinder bore 8a. When the accumulator piston 36 has reached its extreme position leftwards with respect to the first piston member 9, so that the accumulator chamber 37 is at its minimum size as shown in FIG. 4, at which time the pressure within the second fluid chamber 13 and the accumulator chamber 37 has diminished at least to said first predetermined critical fluid pressure value, then the left hand end in the figure of the accumulator piston 36 pushes against the right hand end of the valve rod 47 and displaces the first valve head 46 away from the left hand end of the through hole 9a formed in the left hand end portion of the first piston member 9, and thereby the third fluid chamber 14 is communicated, via the through hole 9a and the cross shaped grooves formed on the left hand end of the accumulator piston 36 and the hole 38, with the second fluid chamber 13. In this condition, therefore, part of the brake fluid which is being returned to the third fluid chamber 14 via the first fluid conduit 26 is passed through the through hole 9a in the first piston member 9 and via the grooves 41 and the hole 38 into the second fluid chamber 13. Also, because the system to the left in the figure of the first large piston land portion 5, as a whole, now contains a lesser quantity of brake fluid than it did before the starting of braking operation, corresponding to the quantity of brake fluid which was passed through the axial hole 36a in the accumulator piston 36 and past the valve element 50 into the first fluid chamber 12 and thence was returned to the fluid reservoir 24 during the last phase of braking action as explained above, therefore a corresponding amount of brake fluid at this time is sucked from the first fluid chamber 12 through the fluid flow holes 30, past the thrust washer 31 and past the second sealing lip flange 28 of the second seal member 29 into the second fluid chamber 13, by the fluid pressure in the second fluid chamber 13 becoming less than atmospheric pressure, so as to remedy this deficiency.

Finally, when the first piston member 9 has reached substantially its restored position as shown in FIG. 4, then the first replenishing port 22 again is communicated with the second fluid chamber 13, by the second sealing lip flange 28 of the second seal element 29 passing said first replenishing port 22 in the rightwards direction in the figure, and at this time brake fluid from the fluid reservoir 24 is freely supplied to the second fluid chamber 13, and thence via the accumulator chamber 37 and the through hole 9a, etc., to the third fluid chamber 14, thus positively ensuring that the braking system as a whole is fully replenished with brake fluid so that no under pressure can exist therein.

The advantage of the third preferred embodiment of the present invention as shown in FIG. 4, which employs the concept of venting the accumulator chamber 37 and the second fluid chamber 13, at a second predetermined critical fluid pressure value which is substantially higher than the first predetermined critical fluid pressure value which starts the operation of the accumulator, to the fluid reservoir 24, is that by the employment of this construction a substantially greater capacity for diminution in the volume of the second fluid chamber 13 is made available than was the case in the first preferred embodiment of the present invention, shown in FIG. 1.

Further, if by any chance the accumulator piston 36 should stick within the accumulator bore 8a formed within the first piston member 9, due to dirt or the like, then the venting action of the venting valve comprising the valve element 50, the compression coil spring 51, etc. ensures that it is still possible for the first piston member 9 to continue moving leftwards in the figure in order to apply the brakes of the vehicle, because in this event the pressure within the second fluid chamber 13 and the accumulator chamber 37 and the through hole 36a within the accumulator piston 36 communicated therewith will very quickly rise up to the second predetermined critical fluid pressure value, and the valve comprising the valve element 50 and the compression coil spring 51, etc., will then open and vent these chambers to the first fluid chamber 12 and to the brake fluid reservoir 24, thus limiting the pressure rise therein.

Figure 6:
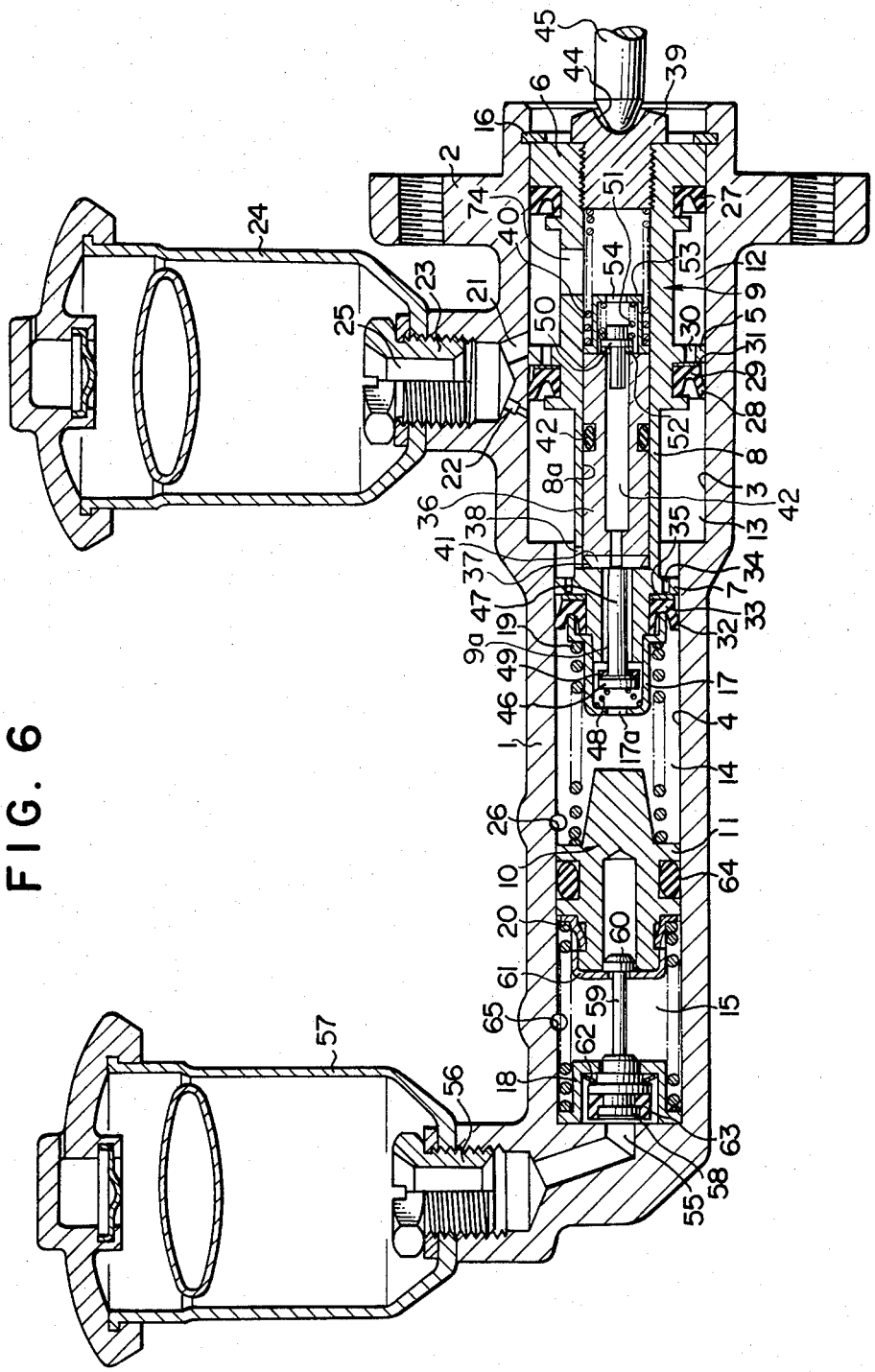
FIG. 6 is a vertical cross sectional view taken along the axis of a brake master cylinder device which is a fourth preferred embodiment of the present invention, which is similar to the third preferred embodiment of the brake master cylinder device according to the present invention shown in FIG. 4, but in which the venting valve construction is different.

In FIG. 6, a fourth preferred embodiment of the brake master cylinder device according to the present invention is shown. In this figure, parts which correspond to parts of the already described first, second, and third embodiments of the present invention, shown in FIGS. 1, 3, and 4, and which have the same functions, are designated by the same reference numerals as in those figures.

In this fourth preferred embodiment, the construction is almost the same as in the third preferred embodiment shown in FIG. 4, except that the construction of the venting valve comprising the valve element 50 and the compression coil spring 51 is a little different. In more detail, on the right hand end of the accumulator piston 36 there is fitted an accumulator piston cap element 53, which has an end hole 54 pierced therein so as to communicate its inside with the interior space within the first piston member 9, to the right in the figure of the accumulator piston 36, to which opens the hole 74. The compression coil spring 40 is mounted over the outside of this cap shaped element 53, and its compression action clamps securely the cap shaped element 53 against the right hand end of the accumulator piston 36. Within the cap shaped element 53 there is fitted a compression coil spring 51, which, in a fashion analogous to that in the third preferred embodiment of the brake master cylinder device according to the present invention shown in FIG. 4, biases the valve element 50 leftwards in the figure, so that via its seal element 52 this valve element 50 blocks the right hand end of the through hole 36a formed within the accumulator piston 36, unless the pressure in this through hole 36a is higher than a second predetermined critical fluid pressure value, analogous to the second predetermined critical fluid pressure value in the third preferred embodiment of FIG. 4.

The operation of this fourth preferred embodiment of the brake master cylinder device according to the present invention is exactly analogous to the operation of the third preferred embodiment, and accordingly further description thereof will be omitted for the purposes of simplicity.

The advantage of this fourth preferred embodiment of the present invention is that because, as the accumulator piston 36 moves to and fro within the accumulator bore 8a formed in the first piston member 9, the length of the compression coil spring 51 which controls the movement of the compression coil spring 50 is not altered, because the right hand end of said compression coil spring 50 bears against the inside of the cap member 53, in contrast to the case in the third embodiment, shown in FIG. 4, in which the right hand end of the compression coil spring 51 was contacted against the screwed plug 39, thereby the setting of a correct valve opening pressure for the venting valve comprising the valve element 50 is made much easier.

Further, because the compression coil spring 51 is not repeatedly compressed and extended by a large amount, during the repeated motion of the accumulator piston 36 leftwards and rightwards within the cylinder bore 8a with respect to the first piston member 9 occasioned by repeated application of the braking system of the vehicle, in contrast to the case in the third embodiment of the present invention shown in FIG. 4, thereby, in this fourth embodiment, the durability of the compression coil spring 51, and its reliability with regard to continued maintenance of a proper high operating pressure for properly keeping the valve comprising the valve element 50, the seal element 52, etc., closed until the pressure within the through hole 36a in the accumulator piston 36 rises to said second predetermined critical fluid pressure value, which as explained above is very important for the safety of the brake master cylinder device according to the present invention, is more positively assured.

Figure 7:
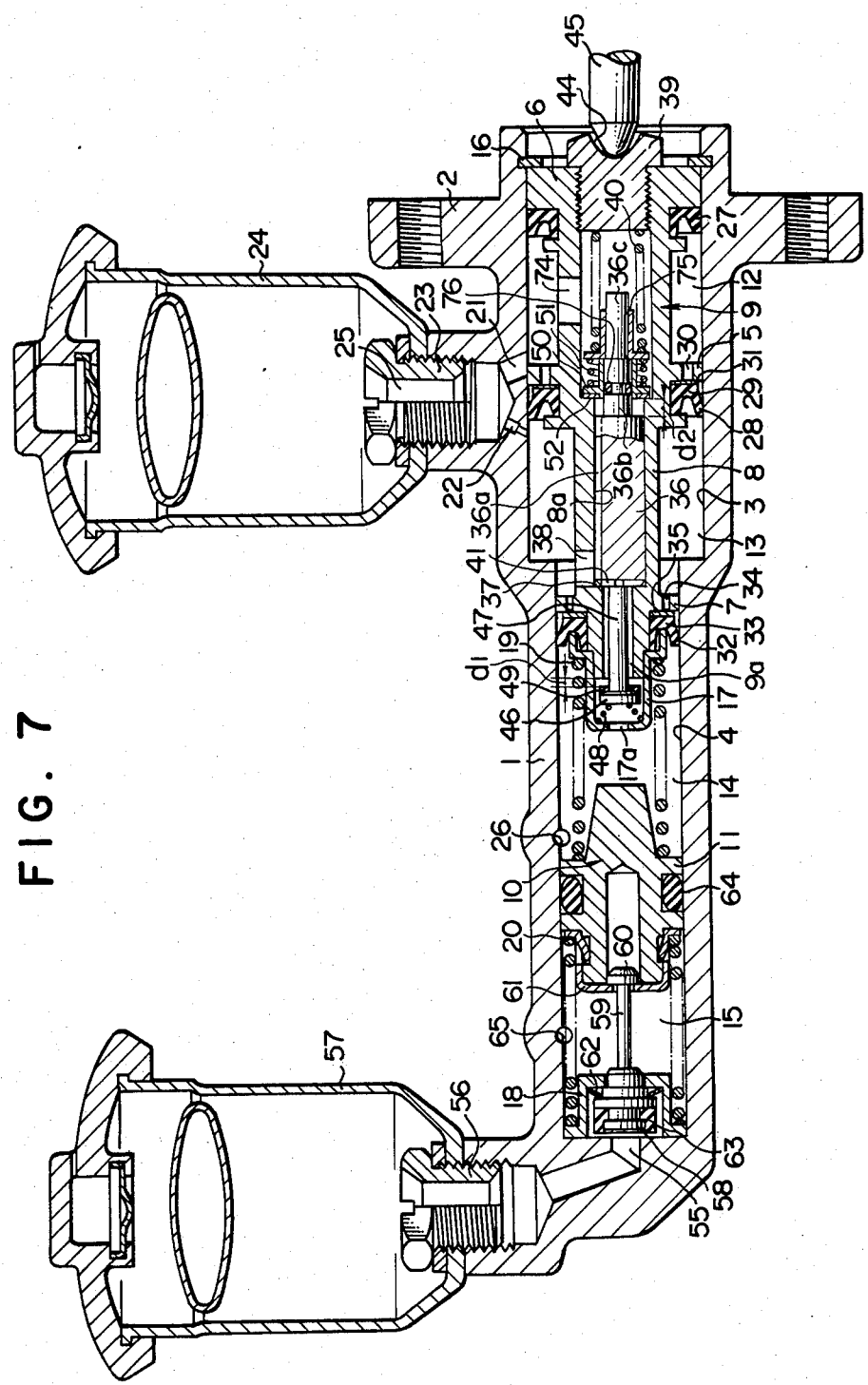
FIG. 7 is a vertical cross sectional view taken along the axis of a brake master cylinder device which is a fifth preferred embodiment of the present invention, which is similar to the first preferred embodiment shown in FIG. 1, but in which, further, the accumulator chamber defined within th piston member is vented to a fluid reservoir, when the accumulator piston has moved through a certain critical distance.

In FIG. 7, a fifth preferred embodiment of the brake master cylinder device according to the present invention is shown. In this figure, parts which correspond to parts of the already described first through fourth embodiments of the present invention, shown in FIGS. 1 through 6, and which have the same functions, are designated by the same reference numerals as in those figures.

In this fifth preferred embodiment, the general construction of the body member 1, with the large cylinder bore 3 and the small cylinder bore 4 formed therein, with the first piston member 9 formed with the first and second large piston lands 5 and 6 and the small piston land 7, engaged respectively with the large cylinder bore 3 and the small cylinder bore 4, and with the second piston member 10 formed with the small piston lands 11 engaged with the small cylinder bore 4, is the same as in the first four preferred embodiments already shown. The construction of the valve arrangement at the left hand end of the first piston member 9 is the same as in the above described first through fourth preferred embodiments of the brake master cylinder device according to the present invention. Further, the arrangement of the hole 25 through the mounting nut member 23 of the brake fluid reservoir 24, and of the equalization port 21 and the first replenishing port 22, is the same as in the preceding embodiments, as is the valve arrangement at the left hand end of the fourth fluid chamber 15 for replenishing the fourth fluid chamber 15 with brake fluid from the second fluid reservoir 57, via the second equalization port 55. Also, particularly, the one way valve arrangements including the first seal element 33 with its sealing lip flange 32, and the second seal element 29 with its sealing lip flange 28, are as previously described.

Further, within the first piston member 9 there is formed an accumulator cylinder bore 8a within its cylindrical portion 8, as in those previous embodiments; and within this accumulator bore 8a there is slidably fitted an accumulator piston 36; although, in this fifth preferred embodiment of the present invention, there is no sealing O-ring around the accumulator piston 36, between it and the cylinder bore 8a, for reasons which will become apparent later in this description.

Figure 8:
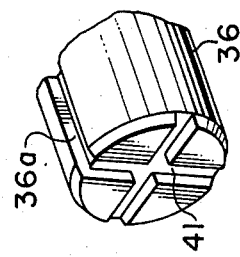
FIG. 8 is a perspective view, similar to FIGS. 2 and 5, showing the end portion of an accumulator piston which is incorporated in the fifth preferred embodiment of the brake master cylinder device of the present invention shown in FIG. 7, and showing a cross shaped groove arrangement thereon, and a side groove which extends along one of the generators thereof.

Further, this accumulator piston 36 is not formed as were the accumulator pistons of any of the previously shown embodiments, but is formed as particularly shown in FIG. 8, i.e. with a cross shape 41 on its left hand end as seen in the figures, and with a groove 36a extending along one of its generators. This groove 36a communicates to the right hand end in FIG. 7 of the accumulator piston 36, and the opening and closing of the right hand end of the groove 36a is controlled by a valve element 50.

In more detail, the right hand end in the figure of the accumulator piston 36 is formed with a first shaft 36b protruding therefrom and coaxial therewith, whose diameter is somewhat smaller than is that of the accumulator piston 36, and the right hand end in the figure of this first shaft 36b, similarly, is formed with a second shaft 36c protruding therefrom and coaxial therewith, whose diameter is somewhat smaller than is the diameter of said first shaft 36b. Around an intermediate portion of the first shaft 36b, there is cut a circumferential groove for fitting a sealing O-ring 76 which will be explained later.

Over the smaller second shaft 36c there is fitted a sleeve 75, which bears against the step formed between the base of the second shaft 36c and the right hand end in the figure of the first shaft 36a, and over which, against a flanged end portion on the left hand end thereof, there is fitted a compression coil spring 40, the end of which remote from said flanged portion bears against the plug 39. This compression coil spring 40 has a function analogous to that of the compression coil spring 40 in the previously described embodiments, in that, via the sleeve 75, it biases the first and second shafts 36b and 36c and the accumulator piston 36 integrally formed therewith in the left hand direction in the figure within the cylinder bore 8a, so as to reduce the volume of the accumulator chamber 37 defined by the left hand end surface of the accumulator piston 36, the inside circumferential surface of the cylinder bore 8a, and the left hand end of the cylinder bore 8a, said accumulator chamber 37 being, as in the previously described embodiments, communicated via the hole 38 to the second fluid chamber 13.

Over the first shaft 36b on the right hand end of the accumulator piston 36, there is slidably fitted a valve member 50, which is formed with a flanged portion on its left hand end as seen in the figure, said flanged portion being provided with a seal element 52 adapted to seal against the right hand end in the figure of the accumulator bore 8a, against a step formed between said accumulator bore 8a and the chamber to the right of this accumulator bore 8a in the drawing, within the first piston member 9. The valve member 50 is biased in the leftward direction in the figure by a compression coil spring 51 fitted between its aforesaid flanged portion and said flanged portion of the sleeve 75, and between the valve member 50 and the first shaft 35b there is provided, seated in the already described groove at an intermediate portion of the first shaft 36b, said sealing O-ring 76.

Thus, when the accumulator piston 36 is in its leftmost position within the accumulator bore 8a as shown in the drawing, wherein its left hand end presses against the left hand end wall of the cylinder bore 8a, then by the pressure of the seal element 52 against the aforesaid step at the right hand end of the accumulator bore 8a, the compression coil spring 51 is compressed by the valve member 50, which is displaced, relative to the first shaft 36b, somewhat rightwards in the drawing. On the other hand, when the accumulator piston 36a and the first and second shafts 36b and 36c integrally formed therewith have moved in the rightwards direction in the figure by more than a certain distance $d_2$, then the step formed between the first shaft 36b and the body of the accumulator piston 36 will come into contact with the left hand end of the valve member 50, and will prevent this valve member 50 from being any further displaced by the compression coil spring 51 leftwards in the figure with respect to the first shaft 36b, and accordingly the valve member 50 will be displaced away from the aforesaid step at the right hand end of the accumulator bore 8a, thereby opening the end of the accumulator bore 8a and the end of the groove 36a along the accumulator piston 36.

In a fashion similar to the arrangement of the third and fourth embodiments shown in FIGS. 4 and 6, the space defined within the first piston member 9 to the right of the right hand end of the accumulator piston 36, within which the compression coil springs 40 and 51, the sleeve 75, and the valve member 50 are housed, is communicated, via a hole 74, to the interior of the first fluid chamber 12, which is as in the preceding embodiments communicated via the equalization port 21 and the hole 25 in the mounting nut member 23 to the interior of the brake fluid reservoir 24, at all times during the movement of the first piston member 9 within the large cylinder bore 3 and the small cylinder bore 4, and which is therefore always at substantially atmospheric pressure.

Particularly according to a particular feature of this fifth embodiment, it is so arranged that the critical distance $d_2$ through which the accumulator piston 36 must move rightwards within the cylinder bore 8a formed within the first piston member 9 against the compression force of the compression coil spring 40, in order to start displacing the valve member 50 away from the right hand end of the groove 36a, which will be hereinafter termed the second predetermined distance $d_2$, is substantially greater than the critical distance through which the accumulator piston 36 must move in order to allow the rod member 47 to move to the right in the figure under the biasing action of the compression coil spring 48 far enough so that the first valve head 46 should be biased against the left hand end of the through hole 9a formed through the left hand end portion of the first piston member 9, in order to interrupt communication between the second chamber 13 and the third chamber 14, which will hereinafter be termed the first predetermined distance $d_1$.

The operation of this fifth preferred embodiment of the brake master cylinder device according to the present invention is as follows.

When the actuating plunger 45 is not biasing the first piston element 9 leftwards in the drawing, then, as in the previous embodiments, the first piston member 9 and the second piston member 10 are in their restored positions, under the action of the compression coil springs 19 and 20, and brake fluid at substantially atmospheric pressure is supplied to the first, the second, the third, and the fourth fluid chambers 12, 13, 14, and 15, through, respectively, the equalization port 21, the first replenishing port 22, the first replenishing port 22 and the through hole 9a, and the second replenishing port 55. When, from this condition, the driver of the vehicle applies froce to the braking member thereof so as to push the first piston member 9, via the actuating plunger 45, leftwards in the drawing, then immediately, as soon as the first piston member 9 has moved a little, the second fluid chamber 13 is cut off from supply of brake fluid from the fluid reservoir 24, by the second sealing lip flange 28 of the second seal member 29 passing the first replenishing port 22.

From this position, as in the previous embodiments, according to the difference in the cross sectional areas of the large cylinder bore 3 and the small cylinder bore 4, the volume of the second fluid chamber 13 progressively decreases, as the first piston member 9 is pushed leftwards in the drawing, and accordingly fluid which is being compressed in this second cylinder chamber 13 is forced through the hole 38 into the accumulator chamber 37, which so far is still at its minimum volume, is forced via the cross shaped grooves 41 on the end of the accumulator piston 36, so as to be communicated to the left hand end of the through hole 9a formed in the left hand end of the first piston member 9, and is forced through this through hole 9a, past the valve head 46 and the sealing member 49 mounted thereon, which are at the present time displaced away from the left hand end of the through hole 9a by the accumulator piston 36 which is currently pressing against the right hand end of the valve rod 47, and is forced through the hole 17a on the end of the cap element 17 into the third fluid chamber 14. Further, in the event that the fluid flow through this fluid path is not sufficient, some brake fluid will also be forced from the second chamber 13 to the third chamber 14, through the fluid flow holes 34 formed in the small piston land portion 7 of the first piston member 9, around the thrust washer 35, and past the first sealing lip flange 32 of the first seal element 33, which is thereby flexed away from the wall of the small cylinder bore 4.

This performance of compressing brake fluid, in which the master cylinder device, as a whole, with respect to the amount of brake fluid expelled through the first fluid conduit 26, per a given amount of movement of the first piston member 9, functions with an effective brake master cylinder diameter which is the diameter of the large cylinder bore 3, continues, as in the previous embodiments shown, until the pressure within the second fluid chamber 13 reaches a predetermined critical pressure value which starts the accumulator piston 36 moving rightwards within the cylinder bore 8a formed within the first piston member 9. At this time, the valve comprising the valve member 50 is still blocking the right hand end of the groove 36a formed along a generator of the accumulator piston 36, because the accumulator piston 36 has not yet moved through the aforesaid second predetermined distance $d_2$. Accordingly, as in the previous embodiments, the accumulator piston 36 move rightwards within the accumulator bore 8a, so as to allow the valve comprising the valve head 46 to close so as to interrupt communication of the second fluid chamber 13 with the third fluid chamber 14 via the through hole 9a formed in the first piston member 9, which occurs after the accumulator piston 36 has moved through a distance equal to the first predetermined distance $d_1$; and the accumulator chamber 37 commences to accumulate excess fluid which is being compressed within the second fluid chamber 13 due to the continued motion of the first piston member 9 leftwards in the drawing.

This accumulator action of the accumulator piston 36 within the first piston member 9 continues, as the accumulator piston 36 moves progressively righwards with respect to the first piston member 9 within the accumulator bore 8a, but since the compression force of the compression coil spring 40 increases as it becomes more compressed, the pressure within the second fluid chamber 13 and the accumulator chamber 37 defined at the left hand end of the accumulator piston 36 and within the axial hole 36a of the accumulator piston 36 which is communicated therewith, gradually increases, until the accumulator piston 36 has moved through a distance equal to the second predetermined distance $d_2$, i.e. until the step formed between the body of the accumulator piston 36 and the first shaft 36b comes into contact with the valve member 50 and displaces it away from the right hand end of the groove 36a formed in the accumulator piston 36, and from the right hand end of the accumulator bore 8a, against the compression action of the compression coil spring 51. At this time, fluid which is being compressed within the second fluid chamber 13 and the accumulator chamber 37 is forced through the groove 36a in the accumulator piston 36, past the sealing member 52 and the valve member 50, into the space in the first piston member 9 to the right of the accumulator piston 36, and out through the hole 74 to the first fluid chamber 12, whence it is returned, via the equalization port 21 and the hole 25 in the mounting nut member 23, to the fluid reservoir 24. Accordingly, by this venting action, the fluid pressure within the second fluid chamber 13 and the accumulator chamber 37 is definitely restricted, so that it cannot rise above the critical pressure value at which the accumulator piston 36 is impelled rightwards in the figure, against the biasing action of the compression coil spring 40, by a distance equal to the second predetermined distance $d_2$.

The operation of the fourth fluid chamber 15 and the second piston member 10, as providing brake fluid via the second output conduit 65, etc., is the same as in the previously explained embodiments, and will not be further discussed.

It is particularly important that the aforementioned second predetermined distance $d_2$ of motion of the accumulator piston 36 rightwards within the accumulator bore 8a, at which the valve comprising the valve member 50 starts to operate and to vent fluid from the second fluid chamber 13 and the accumulator chamber 37 to the first fluid chamber 12 and back to the fluid reservoir 24, should be substantially larger than the first predetermined distance $d_1$, through which the accumulator piston 36 must move in order to allow the valve comprising the first valve head 46 to close, because, if this second predetermined distance $d_2$ should be any chance be less than the first predetermined distance $d_1$, then the valve comprising the valve member 50 would be opened before the valve comprising the valve head 46 had closed, and accordingly pressure within the third fluid chamber 14 would be vented through the axial hole 36a in the accumulator piston 36 to the fluid reservoir 24, thus causing a disastrous failure of braking action of the brake master cylinder device.

Now, after the required braking action for the vehicle has been completed, when the driver removes his foot from the brake pedal thereof, so as to release braking action, then the plunger 45 ceases to impel the first piston member 9 leftwards in the figure, and accordingly, under the actions of the compression coil springs 19 and 20, the first piston member 9 and the second piston member 10 start to move rightwards in the figure, towards their restored positions. Thus, brake fluid starts to flow back through the first conduit 26 into the third fluid chamber 14, and through the second fluid conduit 65 into the fourth chamber 15.

From this condition, as the second fluid chamber 13 increases in volume according to the displacement rightwards in the drawing of the first piston member 9 within the large cylinder bore 3 and the small cylinder bore 4, pressure therein, and in the accumulator chamber 37 communicated therewith, will drop. When this pressure has dropped so far that the accumulator piston 36, which is in a position wherein its distance from the left hand end of the accumulator bore 8a is equal to or slightly greater than the second predetermined distance $d_2$, starts to move to the left in the figure with respect to the accumulator bore 8a in the first piston member 9, under the biasing action of the compression coil spring 40, i.e., when the force of the compression coil spring 40 overcomes the force due to the difference between the pressure in the accumulator chamber 37, and the pressure in the chamber within the first piston member 9 to the right in the figure of the accumulator piston 36, then at this time the step formed between the body of the accumulator piston 36 and the first shaft 36b moves away from the valve member 50, which it leaves as biased leftwards in the figure by the compression coil spring 51, so that its seal element 52 is pressed against the right hand end of the groove 36a along the generators of the accumulator piston 36, and against the end of the accumulator bore 8a, so as thereby to isolate the first fluid chamber 12 from the accumulator chamber 37 and from the second fluid chamber 13.

From this condition, the accumulator piston 36 continues to move leftwards in the figure in the accumulator bore 8a, and to expel fluid from the accumulator chamber 37 through the hole 38 into the second chamber 13, until the accumulator piston 36 reaches a distance equal to the first predetermined distance $d_1$ from the left hand end of the accumulator bore 8a, at which time the left hand end in the figure of the accumulator piston 36 pushes against the right hand end of the valve rod 47 and displaces the first valve head 46 away from the left hand end of the through hole 9a formed in the left hand end portion of the first piston member 9, and thereby the third fluid chamber 14 is communicated, via the through hole 9a and the cross shaped grooves formed on the left hand end of the accumulator piston 36 and the hole 38, with the second fluid chamber 13. In this condition, therefore, part of the brake fluid which is being returned to the third fluid chamber 14 via the first fluid conduit 26 is passed through the through hole 9a in the first piston member 9 and via the grooves 41 and the hole 38 into the second fluid chamber 13.

Also, because the system to the left in the figure of the first large piston land portion 5, as a whole, now contains a lesser quantity of brake fluid than it did before the starting of braking operation, corresponding to the quantity of brake fluid which was passed through the groove 36a in the accumulator piston 36 and past the valve member 50 into the first fluid chamber 12 and thence was returned to the fluid reservoir 24 during the last phase of braking action as explained above, therefore a corresponding amount of brake fluid at this time is sucked from the first fluid chamber 12 through the fluid flow holes 30, past the thrust washer 31 and past the second sealing lip flange 28 of the second seal member 29 into the second fluid chamber 13, by the fluid pressure in the second fluid chamber 13 and the third fluid chamber 14 communicated therewith through the hole 9a becoming less than atmospheric pressure, so as to remedy this deficiency.

Finally, when the first piston member 9 has reached substantially its restored position as shown in FIG. 7, then the first replenishing port 22 again is communicated with the second fluid chamber 13, by the second sealing lip flange 28 of the second seal element 29 passing said first replenishing port 22 in the rightwards direction in the figure, and at this time brake fluid from the fluid reservoir 24 is freely supplied to the second fluid chamber 13, and thence via the accumulator chamber 37 and the through hole 9a, etc., to the third fluid chamber 14, thus positively ensuring that the braking system as a whole is fully replenished with brake fluid so that no under pressure can exist therein.

An advantage of the fifth preferred embodiment of the present invention as shown in FIG. 7, over the third and fourth embodiments shown in FIGS. 4 and 6, is as follows. Because the fifth embodiment employs the concept of venting the accumulator chamber 37 and the second fluid chamber 13 when the accumulator piston 36 has moved from its position wherein the volume of the accumulator chamber 37 is minimum through a second predetermined distance, which is substantially higher than the first predetermind distance through which the accumulator piston 36 must move in order to allow the valve comprising the valve element 46, etc. to close so as to interrupt the communication of the second fluid chamber 13 and the third fluid chamber 14 through the hole 9a to the fluid reservoir 24, thereby, by the employment of this construction, it is more absolutely guaranteed that the venting of the second chamber 13, etc., cannot occur until the third fluid chamber 14 is isolated therefrom, than was the case in the third and fourth preferred embodiments of the present invention shown in FIGS. 4 and 6. Thus, this fifth preferred embodiment has the advantage of safety.

Further, if by any chance the accumulator piston 36 should stick within the accumulator bore 8a formed within the first piston member 9, due to dirt or the like, after having moved through more than the first predetermined distance $d_1$, so that the valve comprising the valve element 46 is closed, then the venting action of the venting valve comprising the valve member 50, the compression coil spring 51, etc. will still occur, because high over-pressure within the second fluid chamber 13 and the accumulator chamber 37, which will be communicated through the groove 36a to the space just to the left of the valve member 50 in the drawing, and will push the valve member 50 rightwards, against the biasing action of the compression coil spring 51, so as to provide an emergency venting for the second fluid chamber 13, and so as to ensure that it is still possible for the first piston member 9 to continue moving leftwards in the figure in order to apply the brakes of the vehicle, because in this event the pressure within the second fluid chamber 13 and the accumulator chamber 37 and the groove 36a along the generators of the accumulator piston 36 communicated therewith will very quickly rise up to the value at which this emergency venting action will occur, and the valve comprising the valve member 50 and the compression coil spring 51, etc., will then open and vent the second fluid chamber 13 to the first fluid chamber 12 and to the brake fluid reservoir 24, thus limiting the pressure rise therein.

Figure 9:
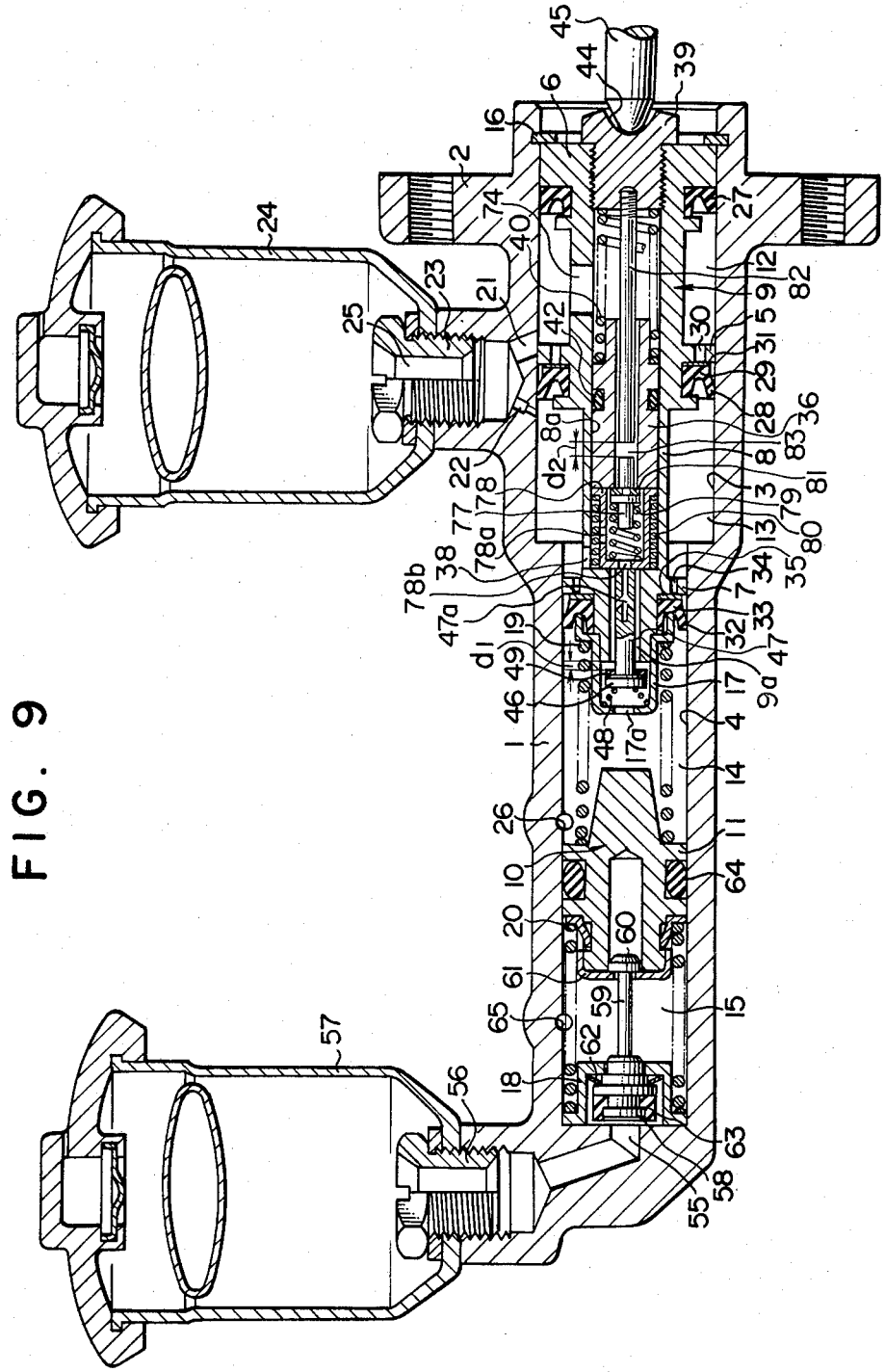
FIG. 9 is a vertical cross sectional view taken along the axis of a brake master cylinder which is a sixth preferred embodiment of the present invention, which is similar to the fifth preferred embodiment of the present invention shown in FIG. 7, but in which the venting valve for venting the accumulator chamber is constructed somewhat differently.

In FIG. 9, a sixth preferred embodiment of the brake master cylinder device according to the present invention is shown. In this figure, parts which correspond to parts of the already described first through fifth embodiments of the present invention, shown in FIGS. 1, 3, 4, 6, and 7, and which have the same functions, are designated by the same reference numerals as in those figures.

In this sixth preferred embodiment, the construction is almost the same as in the fifth preferred embodiment shown in FIG. 7, except that the construction of the venting valve comprising the valve element 50 and the compression coil spring 51, etc., and the construction of the valve rod 47, are a little different. In more detail, on the left hand end of the accumulator piston 36 there is fitted an accumulator piston cap element 78, which has an end hole 78b pierced in its end so as to communicate its inside with the space within the through hole 9a pierced through the left hand end portion of the first piston member 9, when the accumulator piston 36 is in its leftward position within the accumulator bore 8a as seen in the figure. Further, the side of the cap shaped element 78 is pierced with a side hole 78a, which communicates the inside of the cap shaped element 78 to the accumulator chamber defined therearound. A compression coil spring 80 is fitted over the cap shaped element 78, and its right hand end in the figure bears against a flange on the right hand end of the cap shaped element 78, while its left hand end bears against the left hand end of the accumulator bore 8a. By the action of this compression coil spring 80, the cap shaped element 78 is kept securely in place against the left hand end of the accumulator piston 36, at all times during the movement of the accumulator piston 36 within its range of travel within the accumulator bore 8a. In the valve rod 47 there is formed an axial hole 47a with side branches which lead to the peripheral surface of said valve rod 47, so that, even when the accumulator piston 36 is in its most extreme leftward position within the accumulator bore 8a as seen in the figure, so as to push the valve rod 47 leftwards in the figure to open the valve comprising the valve head 46, etc., the second chamber 13 is communicated with the third chamber 14, via the hole 38, the space around the windings of the compression coil spring 80, the hole 78a, the interior space within the cap shaped element 78, the hole 78b, the hole 47a, the space within the through hole 9a around the valve rod 47, the interior of the cap shaped element 17,. and the hole 17a.

Further, within the cap shaped element 78 there is fitted a compression coil spring 79, the left hand end of which in the figure bears against the inside of the cap shaped element 78, while its right hand end bears against flange formed on an intermediate portion of a valve member 77, the part of which to the right of the flange is inserted into an axial through hole 83 which is bored through the center of the accumulator piston 36. Thus, the compression coil spring 79 biases the valve member 77 to the right in the figure, so that it seals, via a seal element 81 mounted on it, the left hand end of this through hole 83. Into the right hand end of the through hole 83 in the accumulator piston 36 there projects an actuating rod 82, the right hand end of which is screwed into the plug 39, and the left hand end of which, when the accumulator piston 36 and the cap shaped element 78 abutted thereto, etc., are at their extreme positions to the left of the accumulator bore 8a as seen in the figure, is spaced from the right hand end of the valve element 77 by a distance $d_2$ which corresponds to the second predetermined distance $d_2$ in the fifth preferred embodiment of the present invention shown in FIG. 7.

In accordance with this construction, the accumulator piston 36, in this sixth preferred embodiment of the present invention, is formed as a simple cylinder with a through axial hole bored along its central axis, and is not formed with any grooves such as the cross shaped arrangement of grooves 41 of the previous embodiments, the function of which is provided by the holes 78a, 78b, and 47a.

As in the fifth preferred embodiment of the present invention, the space to the right in the figure of the accumulator piston 36, within the first piston member 9, to which opens the right hand end of the axial through hole 83, is communicated with the first fluid chamber 12, which, as before, is always communicated with the interior of the brake fluid reservoir 24, via the equalization port 21 and the hole 25 formed through the mounting nut member 23.

The operation of this sixth preferred embodiment of the brake master cylinder device according to the present invention is analogous to the operation of the fifth preferred embodiment, shown in FIG. 7, and accordingly a detailed description thereof will not be given. In the same way, when the accumulator piston 36 has moved through the first predetermined distance $d_1$, then the valve comprising the valve head 46, etc., closes, so as to prevent reverse flow of brake fluid from the third chamber 14 to the second chamber 13; and when the accumulator piston 36 has moved through the second predetermined distance $d_2$, which it is essential should be substantially larger than the first predetermined distance $d_1$, then the interior of the second chamber 13 is vented, via the hole 38, the hole 78a, past the valve comprising the valve element 77, through the axial hole 83 through the accumulator piston 36, through the hole 74, and through the first chamber 12, etc., to the interior of the brake fluid reservoir 24. Further description is omitted, in the interests of brevity of explanation.

The advantage of this sixth preferred embodiment of the present invention is that, because, as the accumulator piston 36 moves to and fro within the accumulator bore 8a, the length of the compression coil spring 79 which biases the venting valve member 77 is not altered, in contrast to the case in the construction of the fifth embodiment, in which the uncompressed or natural length of the compression coil spring 51 set a limit on the maximum distance $d_2$ through which the accumulator piston 36 could be designed to move, before it actuated the venting valve, thereby in this sixth preferred embodiment the distance $d_2$ can be freely adjusted, according to design requirements, merely by regulating the length of the actuating rod 82, thus allowing more flexibility of performance characteristics.

Further, because the compression coil spring 79 is not repeatedly compressed and extended by a large amount, during the repeated motion of the accumulator piston 36 leftwards and rightwards within the cylinder bore 8a with respect to the first piston member 9 occasioned by repeated application of the braking system of the vehicle, in contrast to the case for the compression coil spring 51 in the fifth embodiment of the present invention shown in FIG. 7, thereby, in this sixth embodiment, the durability of the compression coil spring 79, and its reliability with regard to continued maintenance of a proper operating force for properly keeping the valve comprising the valve element 77, the seal element 81, etc., closed until the accumulator piston 36 has moved through at least said second predetermined distance $d_2$, which as explained above is very important for the safety of the brake master cylinder device according to the present invention, is more positively assured.

Figure 10:
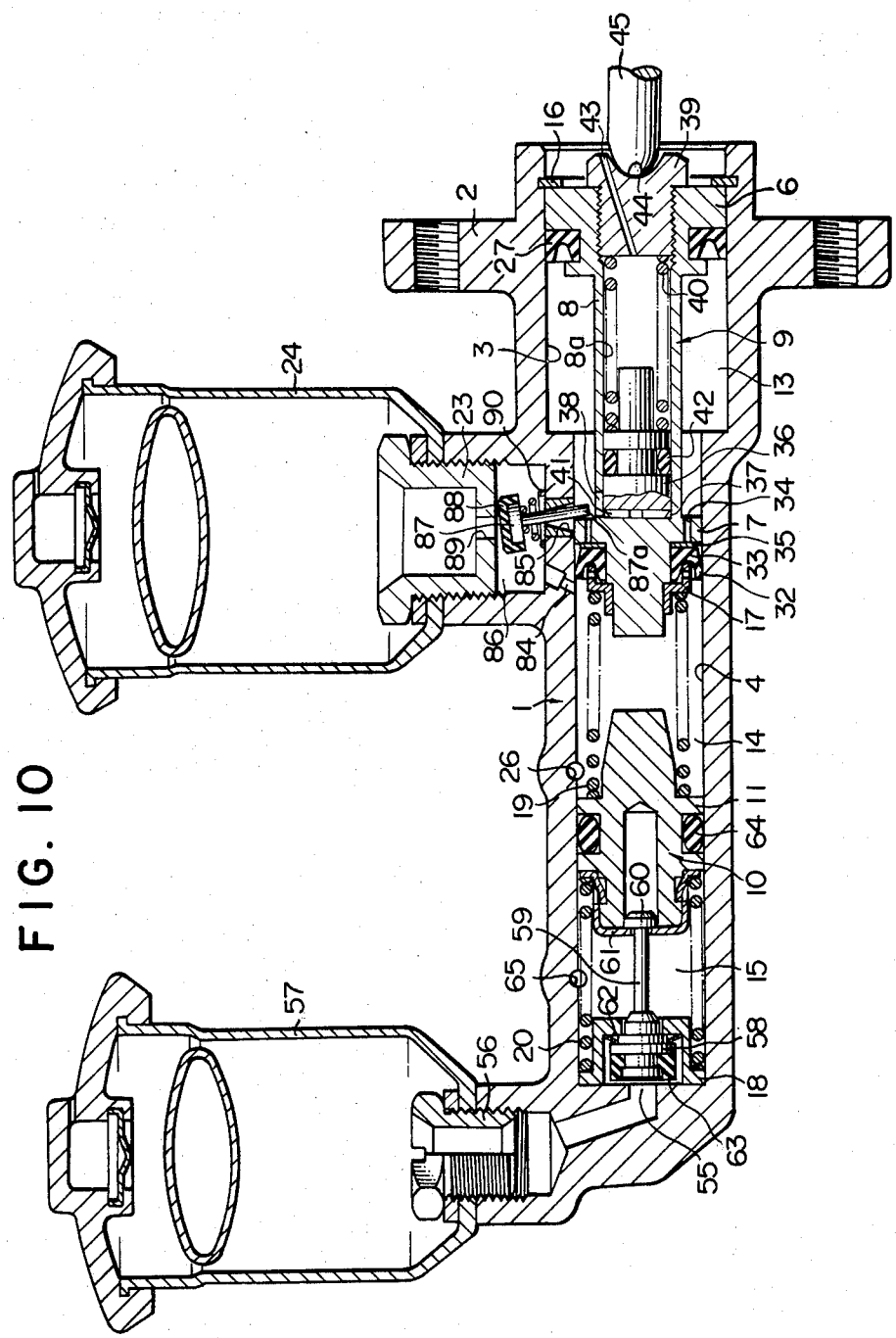
FIG. 10 is a vertical cross sectional view taken along the axis of a brake master cylinder device which is a seventh preferred embodiment of the present invention, in which no valve is provided at the end of the piston member thereof to communicate the large and the small chamber thereof, and in which a refilling valve of a particular construction is provided for refilling the large and small cylinder chambers.

In FIG. 10, a seventh preferred embodiment of the brake master cylinder device according to the present invention is shown. In this figure, parts which correspond to parts of the already described first through sixth embodiments of the present invention, shown in FIGS. 1, 3, 4, 6, 7, and 9, and which have the same functions, are designated by the same reference numerals as in those figures.

In this seventh preferred embodiment, the general construction of the body member 1, with the large cylinder bore 3 and the small cylinder bore 4 formed therein, and the construction of the second piston member 10 formed with the small second piston lands 11 engaged with the small cylinder bore 4, are the same as in the first six preferred embodiments already shown. However, the construction of the first piston member 9 is different. The first piston member 9 is formed with only one large piston land, designated by the reference numeral 6 in the figure, and is further formed with a small piston land 7, the large piston land 6 being engaged with the large cylinder bore 3, and the small piston land 7 being engaged with the small cylinder bore 4, so that the first piston member is slidably supported within the large and small cylinder bores 3 and 4. Thus, a first fluid chamber 13 is defined by and between the large piston land 6 and the small piston land 7, in cooperation with the large cylinder bore 3 and the small cylinder bore 4; a second fluid chamber 14 is defined by and between the small piston land 7 and the second piston lands 11, in cooperation with the small cylinder bore 4; and a third fluid chamber 15 is defined by and between the second piston lands 11 and the left hand end of the small cylinder bore 4, in cooperation with the wall of the small cylinder bore 4. These chambers are arranged in the order of their reference numbers from the right to the left of the figure.

The arrangement of the compression coil springs 19 and 20 is the same as in the six embodiments already shown, as is the valve arrangement at the left hand end of the third fluid chamber 15 for replenishing the third fluid chamber 15 with brake fluid from the second fluid reservoir 57, via the second equalization port 55. Also, particularly, the one way valve arrangement including the seal element 33 with its sealing lip flange 32 is as already described, and of course there is no sealing structure corresponding to the second seal element 29 of the previously described embodiments.

The arrangement of the accumulator cylinder bore 8a is formed within the cylindrical portion 8 of the first piston member 9, of the accumulator piston 36 fitted slidably therein, and of the compression coil spring 40 which biases the accumulator piston 36 leftwards in the figure with respect to the first piston member 9 so as to reduce the size of the accumulator chamber 37 which is defined at the left hand end of the accumulator piston 36 and which is communicated with the first chamber 13 via the hole 38 in the side of the accumulator cylinder bore 8a, is exactly the same as in the first and second preferred embodiments of the present invention shown in FIGS. 1 and 3, except for the proportions thereof; but, in contrast to those previously described embodiments, there is in this embodiment no valve provided such as the valve comprising the valve head 46 of those embodiments, which was adapted to be actuated by the accumulator piston 36 pressing on the right hand end of the valve rod 47, when the accumulator piston 36 was at its extreme position to the left with respect to the cylinder bore 8a. On the contrary, in the present seventh embodiment, the left hand end portion of the first piston member 9 is solid, with no through hole such as the through hole 9a of the previous embodiments; and the left hand end of the accumulator bore 8a is closed by a plane wall.

On the upper part of the right hand side of the body member 1 there is mounted a first hydraulic brake fluid reservoir 24, via a first mounting cup shaped nut member 23 screwed between it and the body member 1, and under this cup shaped nut member 23 there is defined a brake fluid chamber 86. In the body of the body member 1, between the brake fluid chamber 86 and the interior of the small cylinder bore 4, there are pierced two apertures: a first replenishing port 84, which is communicated to the second fluid chamber 14, substantially, only when the first piston member 9 is at the extreme right hand end of its range of movement within the large cylinder bore 3 and the small cylinder bore 4, as shown in the drawing, and communication of which to the second fluid chamber 14 is otherwise interrupted; and an opening 85, through which protrudes a valve rod 87a, and which is communicated to the first fluid chamber 13 at all times when the first piston member 9 moves throughout its range of axial movement within the large cylinder bore 3 and the small cylinder bore 4.

The lower end of the valve rod 87a projects within the first cylinder chamber 13, at such an axial position therein that when, as seen in the drawing, the first piston member 9 is at the extreme right hand end of its range of movement within the large cylinder bore 3 and the small cylinder bore 4, the right hand side of the small piston land portion 7 contacts the end portion of said valve rod 87a and drives it slightly to the right in the drawing. The upper end of the valve rod 87a is connected to the center of a valve member 87, on the upper side of which there is mounted a seal element 88. The valve member 87 and the valve rod 87a connected thereto are impelled upwards in the drawing by a conical compression coil spring 90, so that the seal element 88 is pressed against the end of a central fluid channel 89 formed through the center of the bottom of the cup shaped nut member 23.

Accordingly, when the first piston member 9 is not at its extreme position to the right in the large cylinder bore 3 and the small cylinder bore 4, then its small piston land portion 7 does not deflect the end of the valve rod 87, and accordingly the valve member 87 and the seal element 88 mounted thereon are squarely pressed by the conical compression coil spring 90 upwards against the end of the central fluid channel 89, and in this condition the assembly functions as a one way valve, allowing fluid to pass relatively freely from the first hydraulic brake fluid reservoir 24 through the central fluid channel 89 of the cup shaped nut member 23, past the valve member 87 which is deflected slighly thereby, into the brake fluid chamber 86, and through the opening 85 into the first cylinder chamber 13. In accordance with this, in order that the flow resistance of this fluid path should be low, the compression force of the conical compression coil spring 90 is arranged to be rather low, as compared to the force exerted by atmospheric pressure on the area of the end of the central fluid channel 89, and accordingly, whenever the fluid pressure within the first cylinder chamber 13 and the brake fluid chamber 86 drops substantially below atmospheric, the one way valve incorporating the valve member 87, etc., functions so as to refill the first cylinder chamber 13 with brake fluid from the fluid reservoir 24 and so as to raise its pressure to atmospheric. On the other hand, if the pressure within the first cylinder chamber 13 and the brake fluid chamber 86 rises to be higher than the atmospheric pressure present in the fluid reservoir 24, then this pressure pushes the valve member 87 tightly against the end of the central fluid channel 89, and thus blocks the fluid channel 89.

Further, when on the other hand the first piston member 7 is in its extreme right hand position within the large cylinder bore 3 and the small cylinder bore 4, as seen in the figure, then the displacement to the right in the figure of the end of the valve rod 87a by the small piston land portion 7 tilts the valve member 87 sideways somewhat with respect to the end of the central fluid channel 89, so as positively to stop the blocking of the end of the central fluid channel 89 by this valve member 87, irrespective of the pressures in the brake fluid chamber 86 and the fluid reservoir 24. Thus, in this condition, free communication is established between the first cylinder chamber 13 and the fluid reservoir 24, as well as between the second cylinder chamber 14 and the fluid reservoir 24, in both directions.

The operation of the brake master cylinder device explained above according to the present invention may be summarized as follows.

When the brake pedal of the vehicle is not depressed, then the actuating plunger 45 provides no biasing action to the first piston member 9 in the left hand direction in the drawing, and, therefore, the first piston member 9 and the second piston member 10 are in their restored positions as shown in the drawing, and the first fluid chamber 13 is connected, via the opening 85 and the brake fluid chamber 86, past the valve element 87, which is somewhat tilted sideways away from the end of the central fluid channel 89 in the bottom of the cup shaped nut member 23, by the driving slightly to the right in the drawing of the lower end of the valve rod 87a by the small piston land portion 7, so as to open this central fluid channel 89, to the hydraulic brake fluid in the interior of the first hydraulic brake fluid reservoir 24, and is substantially at atmospheric pressure; the second fluid chamber 14 is communicated, via the first replenishing port 84 and the brake fluid chamber 86, etc., to the hydraulic brake fluid in the interior of the first hydraulic brake fluid reservoir 24, and is also at substantially atmospheric pressure; and the second fluid chamber 15 is communicated, via the valve 58 and the second replenishing port 55 and the hole in the second mounting nut 56, to the hydraulic brake fluid stored in the second hydraulic brake fluid reservoir 57, and is also substantially at atmospheric pressure.

Now, when the brake pedal of the vehicle is depressed by the foot of an operator, the actuating plunger 45 moves to the left in the drawing, thereby passing the first piston member 9 to the left in the drawing. Almost immediately, as soon as the first piston member 9 moves, the communication between the first replenishing port 84 and the second fluid chamber 14 is interrupted, by the sealing lip flange 32 of the seal element 33 passing the end of this first replenishing port 84, where it opens in the small cylinder bore 4. Further, the small piston land 7 of the first piston member 9 moves to the left in the drawing, and ceases to impel the lower end of the valve rod 87a to the right, whereby now, as previously explained, the conical compression coil spring 90 is able to impel the valve member 87 and the seal element 88 thereon against the end of the central fluid channel 89 formed in the cup shaped nut member 23, so that this assembly functions as a one way valve, allowing fluid flow from the fluid reservoir 24 to the brake fluid chamber 86 and the first cylinder chamber 13, but not in the reverse direction.

Further, as the first piston member 9 moves to the left in the large cylinder bore 3 and the small cylinder bore 4, against the biasing spring force of the first compression coil spring 19 and the second compression coil spring 20, then, because of the difference in the diameters of the large cylinder bore 3 and the small cylinder bore 4, and because of the associated difference in the cross sectional areas thereof, the volume of the first fluid chamber 13 will progressively decrease. The hydraulic brake fluid within the first fluid chamber 13 cannot escape through the opening 85 and the brake fluid chamber 86 back to the first hydraulic brake fluid reservoir 24, because the communication of the hydraulic brake fluid chamber 86 to the fluid reservoir 24 is interrupted by the one way valve comprising the valve member 87, etc., as explained above, and because as yet the pressure within the first cylinder chamber 13 and the brake fluid chamber 86 is assumed not to have reached the predetermined pressure value at which the accumulator comprising the accumulator piston 36 starts to perform accumulating action; and accordingly this hydraulic brake fluid compressed within the first cylinder chamber 13 is forced through the fluid flow holes 34 formed in the small piston land portion 7, past the thrust washer 35, and past the sealing lip flange 32 of the seal element 33, into the second fluid chamber 14. Thus, in this seventh preferred embodiment, this one way valve structure is relied upon for the entire brake fluid transfer between the first fluid chamber 13 and the second fluid chamber 14, and no valve provided in the left hand end of the first piston member 9 is relied upon.

This performance of compressing brake fluid, in which the master cylinder device, as a whole, with respect to the amount of brake fluid expelled through the first fluid conduit 26, per a given amount of movement of the first piston member 9, functions with an effective brake master cylinder diameter which is the diameter of the large cylinder bore 3, continues as in the previous embodiments shown, until the pressure within the first fluid chamber 13 reaches a predetermined critical pressure value sufficient to start the accumulator piston 36 moving rightwards within the cylinder bore 8a formed within the first piston member 9. Then, the accumulator piston 36 moves rightwards within the accumulator bore 8a, and the accumulator chamber 37 commences to accumulate excess fluid which is being compressed within the first fluid chamber 13 due to the continued motion of the first piston member 9 leftwards in the drawing. Accordingly, from this condition, as the first piston member 9 is displaced further to the left within the large cylinder bore 3 and the small cylinder bore 4 by further increase of pressure of the foot of the operator of the vehicle upon the brake pedal thereof, the hydraulic brake fluid pressure within the first fluid chamber 13 does not substantially increase further, because the diminution in the volume of the first fluid chamber 13, caused by the difference in the diameters of the large cylinder bore 3 and the small cylinder bore 4, and the associated difference in the cross sectional areas thereof, drives hydraulic brake fluid out of the first fluid chamber 13, into the accumulator chamber 37. Thereby, further compression of hydraulic brake fluid within the diminishing volume of the first fluid chamber 13 is prevented, by the accomodation of this excess hydraulic brake fluid within the accumulator chamber 37.

Because the action of the sealing lip flange 32 of the seal element 33 allows only flow of fluid from the first fluid chamber 13 to the second fluid chamber 14, because a pressure difference tending to cause such flow presses said sealing lip flange 32 away from the wall of the small cylinder bore 4, and does not permit fluid to flow in reverse fashion from the second fluid chamber 14 to the first fluid chamber 13, because any pressure difference tending to cause such reverse flow urges the sealing lip flange 32 against the wall of the small cylinder bore 4 so as to seal therebetween, thereby the reverse flow of fluid from the second cylinder chamber 14 to the first cylinder chamber 13 is positively prevented, and, accordingly, the second fluid chamber 14 is now functioning as a brake master cylinder chamber on its own, without reference to the first fluid chamber 13, and, as the volume of this second fluid chamber 14 is decreased by the differential movement between the first piston member 9 and the second piston member 10, hydraulic brake fluid continues to be expelled through the first output conduit 26 to the rear braking system associated with this first output conduit 26, in an amount, relative to the differential motion between the first piston member 9 and the second piston member 10, which is determined by the square of the diameter of the small cylinder bore 4 formed in the body member 1, and by its associated cross sectional area, without any reference to the diameter of the large cylinder bore 3. Because the diameter of this small cylinder bore 4 is substantially smaller than the diameter of the large cylinder bore 3, the amount of hydraulic brake fluid expelled through the first output port 26, per unit amount of displacement of the first piston member 9 within the large cylinder bore 3 and the small cylinder bore 4, is substantially smaller than was previously the case, before the accumulator chamber 37 had commenced to accumulate fluid. Accordingly, the mechanical advantage obtained by the brake master cylinder device according to the present invention is greater in this second operational condition.

The operation of the fourth fluid chamber 15 and the second piston member 10, as providing brake fluid via the second output conduit 65, etc., is the same as in the previously explained embodiments, and will not be further discussed.

Thus, fluid pressure is supplied to the front braking system connected to the second output port 65 and to the rear braking system connected to the first output port 26. When it is desired to relieve this braking action, then the driver of the vehicle removes his foot from the brake pedal thereof, and, accordingly, the actuating plunger 45 ceases to exert pressure on the first piston member 9, and, accordingly, under the restoring spring forces of the first compression coil spring 19 and the second compression coil spring 20, the first piston member 9 and the second piston member 10 start to move towards their restored or equilibrium positions. Thereby, hydraulic brake fluid flows from the front braking system of the vehicle through the conduits connected thereto, through the second output port 65, and into the third fluid chamber 15, and hydraulic brake fluid flows from the rear braking system of the vehicle, through the conduits connected thereto, through the first output port 26, and into the second fluid chamber 14. Further, at this time, as the first piston member 9 moves to the right within the large cylinder bore 3 and the small cylinder bore 4, as the first cylinder chamber 13 increases in volume, the pressure therein quickly drops to be lower than said predetermined critical pressure value at which the accumulator chamber 37 starts to accumulate fluid. Shortly thereafter, according to continued increase of the volume of the first cylinder chamber 13, the pressure within said first cylinder chamber 13 and the brake fluid chamber 86 becomes lower than atmospheric, and at this time the one way valve, above described, comprising the valve member 87 and the conical compression coil spring 90, etc., opens, so as to supply additional brake fluid from the fluid reservoir 24, via the central fluid channel 89 formed in the bottom of the cup shaped nut member 23, and past said one way valve, to refill the first cylinder chamber 13.

As an overall result of this, the braking effect applied to the rear braking system of the vehicle is smoothly relieved. Further, in a per se conventional fashion, when the first piston member 9 finally reaches its rightmost position within the large cylinder bore 3 and the small cylinder bore 4, the first replenishing port 84 is communicated with the second fluid chamber 14, and, further, the small piston land portion 7 displaces the lower end of the valve rod 87a to the right in the drawing, and thereby, as explained above, opens the valve comprising the valve member 87, etc., so as to allow free two way communication between the first cylinder chamber 13, the second cylinder chamber 14, and the interior of the fluid reservoir 24, via this valve. Therefore, the fluid in the second cylinder chamber 14 and the fluid conduit connected to the port 26 flows through the first replenishing port 84, the brake fluid chamber 86, and the one way valve comprising the valve member 87, etc., which is now compulsorily opened, to the fluid reservoir 24, as the hydraulic brake actuator (not shown in the figure) is restored by the return spring thereof (also not shown in the figure), this flow of fluid corresponding to the flow of fluid which was transferred from the first cylinder chamber 13 to the second cylinder chamber 14 when the piston 9 was driven to the left before the pressure of fluid in the first cylinder chamber 13 reached said predetermined pressure value. On the other hand, in this completely restored condition, the first cylinder chamber 13 and the brake fluid chamber 86 are completely refilled with brake fluid from the interior of the fluid reservoir 24, without even slight flow resistance to this refilling.

Although the first replenishing port 84 which connects the second cylinder chamber 14 to the reservoir 24 when the first piston member 9 is in its rightmost position is provided to open to the brake fluid chamber 86 which is freely connected to the fluid reservoir 24 only when the first piston member 9 is in its rightmost position as seen in the figure, in the shown embodiment, for convenience of design and construction, this replenishing port may be so arranged as to connect the second cylinder chamber 14 directly to the reservoir 24, as an alternative.

Figure 11:
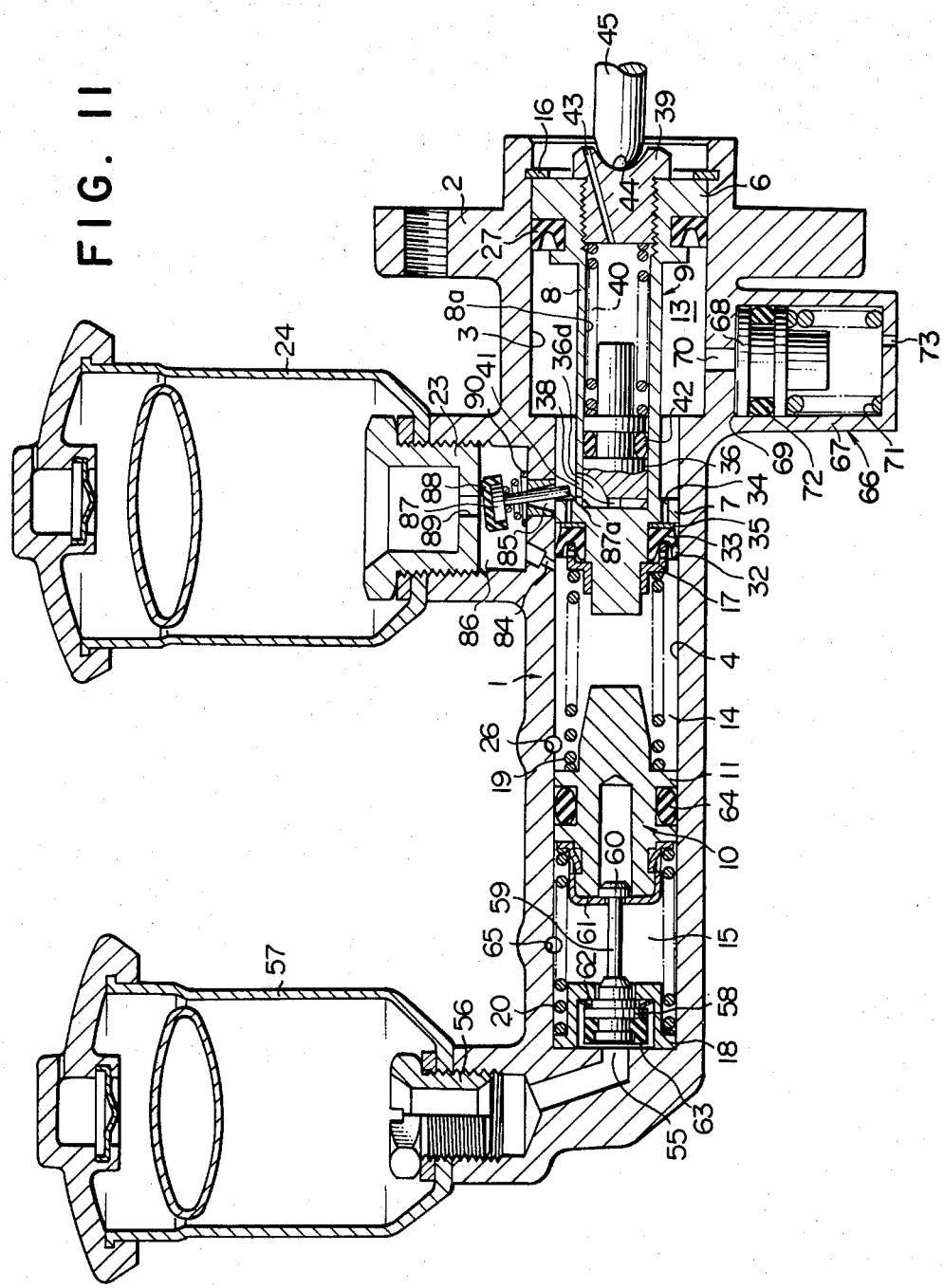
FIG. 11 is a vertical cross sectional view taken along the axis of a brake master cylinder device which is an eighth preferred embodiment of the present invention, which is very similar to the seventh preferred embodiment of the brake master cylinder device of the present invention shown in FIG. 10, but which incorporates an accumulator piston formed with a notch, and an external accumulator.

In FIG. 11, an eighth preferred embodiment of the brake master cylinder device according to the present invention is shown. In this figure, parts which correspond to parts of the already described first through seventh embodiments of the present invention, shown in FIGS. 1, 3, 4, 6, 7, 9, and 10, and which have the same functions, are designated by the same reference numerals as in those figures.

In this eighth preferred embodiment, the general construction of the brake master cylinder device according to the present invention is the same as in the seventh preferred embodiment of the present invention shown in FIG. 10, except for two features: a cutaway notch 36d, the upper part of which in the figure corresponds to the internal periphery of the hole 38 through the side of the accumulator bore which leads to the first fluid chamber 13, is formed on the side of the accumulator piston 36, so as better to communicate the fluid pressure within the first chamber 13 to the accumulator chamber defined at the left hand end of the accumulator piston 36, especially when the accumulator piston 36 is at the left hand end of its accumulator bore; and, further, in addition to the accumulator system provided by the accumulator piston 36, etc., which is provided within the first piston member 9, there is provided a further accumulator system for hydraulic brake fluid which requires to be expelled from the first fluid chamber 13. This additional accumulator system includes an accumulator feed hole 70 which leads out from the first fluid chamber 13 downwards in the figure to an auxiliary accumulator 66, which comprises an auxiliary accumulator casing 67 which is formed integrally on the lower part of the master cylinder body member 1. An auxiliary accumulator piston 68 is mounted slidably within the auxiliary accumulator casing 67, and in a groove on the auxiliary accumulator piston 68 there is fitted an auxiliary accumulator sealing O-ring 72, between it and the auxiliary accumulator casing 67, so as to seal therebetween. At the bottom of the auxiliary accumulator casing 67 there is provided an air vent hole 73, and between the bottom of the auxiliary accumulator casing 67 and the lower part of the auxiliary accumulator piston 68 there is provided an auxiliary accumulator compression coil spring 77, which biases the auxiliary accumulator piston 68 upwards in the drawing. Thus, above the auxiliary accumulator piston 68, there is defined an auxiliary accumulator chamber 69, which is communicated through the aforesaid accumulator feed hole 70 to the second fluid chamber 13.

In a manner similar to the operation of the accumulator system comprising the accumulator piston 36, its accumulator chamber, the accumulator compression coil spring 40, etc., this auxiliary accumulator 66 accommodates excess hydraulic brake fluid that is driven out of the first fluid chamber 13, when the transfer of fluid from the first fluid chamber 13 to the second fluid chamber 14 has ceased.

The advantage of the eighth preferred embodiment of the brake master cylinder device according to the present invention shown in FIG. 11 is that the total volume available for accumulation of hydraulic brake fluid is greater than was the case in the seventh preferred embodiment of the present invention shown in FIG. 10.

As an alternative, it would be possible to provide only an accumulator on the outside of the body member 1, like the auxiliary accumulator 66, and not to provide any accumulator inside the first piston member 9 like the accumulator comprising the accumulator piston 36.

Figure 12:
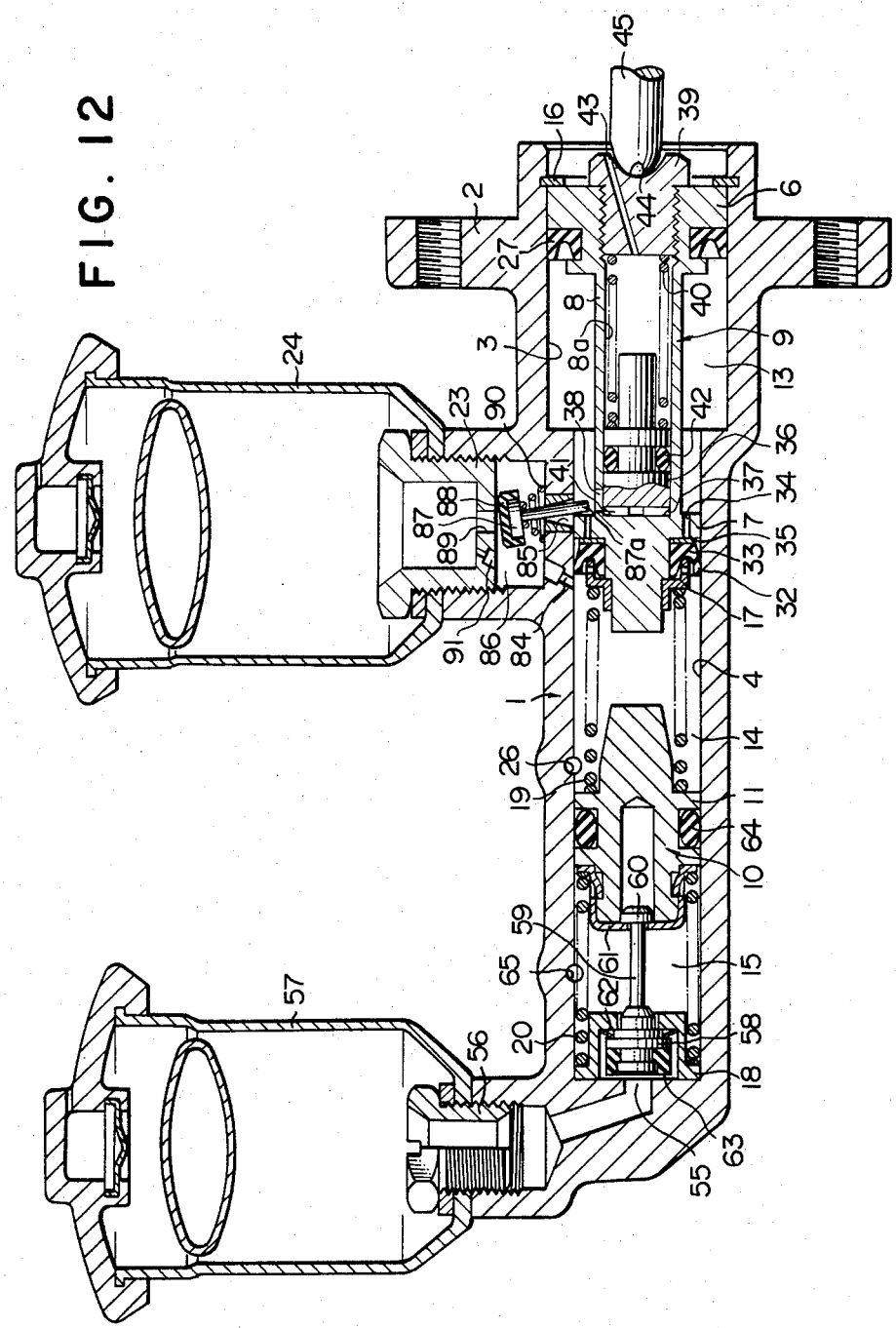
FIG. 12 is a vertical cross sectional view taken along the axis of a brake master cylinder device which is a ninth preferred embodiment of the present invention, which is very similar to the seventh preferred embodiment of the present invention shown in FIG. 10, but in which a small relief aperture for the large cylinder chamber thereof is further provided.

In FIG. 12, a ninth preferred embodiment of the brake master cylinder device according to the present invention is shown. In this figure, parts which correspond to parts of the already described first through eighth embodiments of the present invention, shown in FIGS. 1, 3, 4, 6, 7, 9, 10, and 11, and which have the same functions, are designated by the same reference numerals as in those figures.

In this ninth preferred embodiment, the construction is exactly the same as that in the seventh preferred embodiment of the brake master cylinder device according to the present invention shown in FIG. 10, except that through the bottom wall of the cup shaped member 23, in addition to the provision of the one way valve comprising the valve member 87, the conical compression coil spring 90, etc., there is pierced a narrow vent orifice 91. Thus, the first fluid chamber 13 is always vented to a certain degree to the fluid reservoir 24 through this narrow vent orifice 91. Since the orifice 91 is very restricted, it does not substantially disturb the usual functioning of the brake master cylinder device, already described with reference to the seventh embodiment shown in FIG. 10; i.e. the amount of hydraulic brake fluid which escapes through the narrow vent orifice 91, during the first phase of operation of the brake master cylinder device, before the accumulator comprising the accumulator piston 36, etc., has started to function, in inconsiderable, and does not deteriorate braking action. However, in the second phase of braking operation, when the second fluid chamber 14 is functioning as a master cylinder on its own, and excess fluid being compressed within the first fluid chamber 13 is being accumulated within the accumulator, which is therefore restricting the pressure rise within this first chamber 13, at this time the moderate venting action of this vent orifice 19 contributes to restricting the pressure rise in the first fluid chamber 13, by allowing some of the brake fluid being compressed therein to be vented to the reservoir 24. Further, if the function of the accumulator comprising the accumulator piston 36 should become unavailable for any reason, such as due to sticking of the accumulator piston 36 within its accumulator bore, or such as due to the accumulator piston 36 reaching its extreme rightmost position within its accumulator bore (i.e., saturation of the accumulator), then the force required to move the first piston member 9 leftwards in the figure, in order to continue providing braking action, will become higher than before, due to a high pressure which will rapidly develop within the first fluid chamber 13; but this pressure will be vented through the vent orifice 91 to an extent which will allow the piston member 9 to continue to be readily moved leftwards so as to effect the final braking action by the small piston land 7; and accordingly uncontrolled rise of pressure in the first fluid chamber 13, which could cause a requirement for hard stepping on action of the brake pedal in order to effect the necessary braking action, is positively prevented.

Figure 13:
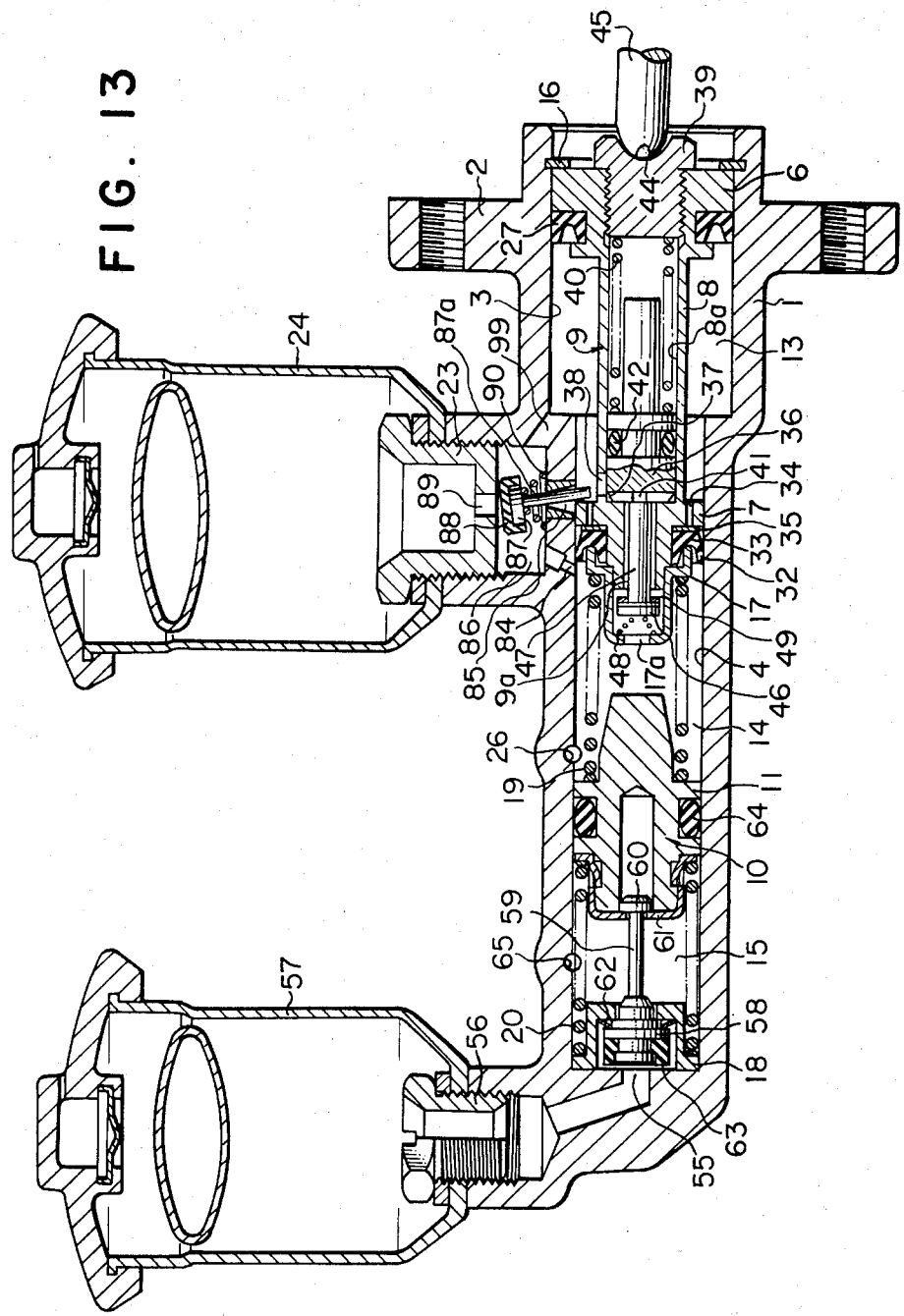
FIG. 13 is a vertial cross sectional view taken along the axis of a brake master cylinder device which is a tenth preferred embodiment of the present invention, in which a valve is provided at the end of the piston member thereof, as in the first preferred embodiment of the present invention shown in FIG. 1, and further a refilling valve is provided, similar to the refilling valve in the seventh preferred embodiment of the present invention shown in FIG. 10.

In FIG. 13, a tenth preferred embodiment of the brake master cylinder device according to the present invention is shown. In this figure, parts which correspond to parts of the already described first through ninth embodiments of the present invention, shown in FIGS. 1, 3, 4, 6, 7, 9, 10, 11, and 12, and which have the same functions, are designated by the same reference numerals as in those figures.

In this tenth preferred embodiment, the general construction is similar to the construction of the seventh preferred embodiment of the present invention shown in FIG. 10, except for two features: a communicating port 99 is provided which communicates the interior of the brake fluid chamber 86 at all times with the first fluid chamber 13, with a flow resistance which is essentially zero, i.e., more positively than does the opening 85; and also through the left hand end in the figure of the first piston member 9 there is pierced a through hole 9a, which is controlled by a valve comprising a valve head 46 and a valve rod 47, of the same construction as the valve in the first through the sixth preferred embodiments of the brake master cylinder device according to the present invention, shown in FIGS. 1, 3, 4, 6, 7, and 9.

In more detail, the left hand end of this transfer hole 9a opens under a first piston member cap element 17, and in the end of this cap element 17 there is pierced an end hole 17a, so as to communicate the second fluid chamber 14 with the transfer hole 9a. The valve head 46 is mounted within the first piston member cap element 17, and the valve rod 47 protrudes therefrom and passes along the axis of the transfer hole 9a, the right hand end of said valve rod 47 being in contact with the left hand end of the accumulator piston 36, when the accumulator piston 36 is in its leftwardly biased position with respect to the first piston member 9, as shown in the drawing. Over the valve rod 47, against the valve head 46, there is mounted a valve seal element 49 made of a rubber like elastomeric material, and between the left hand side of the valve head 46 and the inner side of the left hand end of the first piston member cap element 17 there is mounted a valve biasing compression coil spring 48, which biases the valve head 46 and the valve 47 to the right.

Therefore, when the accumulator piston 36 is in its leftwardly biased position by the action of the accumulator compression coil spring 40, within the accumulator cylinder bore in the first piston member 9, as shown in the drawing, then its left hand end bears against the right hand end of the valve rod 47, and thereby biases the valve head 46, against the restoring force of the valve biasing compression coil spring 48, leftwards in the drawing with respect to the transfer hole 9a, so that the valve seal element 49 is brought away from contact with the left hand end of the transfer hole 9a, and thereby this left hand end of the transfer hole 9a is opened. Thereby, communication is established between the first fluid chamber 13 and the second fluid chamber 14 for passing of hydraulic brake fluid therethrough, via the communicating hole 38, the cross shape 41 cut in the end of the accumulator piston member 36 (which is of the same form as the accumulator pistons of the first and second preferred embodiments of the present invention, which is shown in FIG. 2), the part of the transfer hole 9a around the valve rod 47, past the valve seal element 49, around the valve head 46, through the interstices of the valve biasing compression coil spring 48, and through the end hole 17a.

However, as soon as the accumulator piston 36 moves a little in the right hand direction with respect to the first piston member 9, within the accumulator cylinder bore 8a, then this allows the valve rod 47 and the valve head 46 to move in the right hand direction with respect to the wall of the transfer hole 9a, so that the valve seal element 49 is brought into sealing contact against the left hand end of the transfer hole 9a, and interrupts the abovementioned communication, so as to isolate the first fluid chamber 13 from the second fluid chamber 14 and so as to cut off flow of hydraulic brake fluid therebetween. In accordance with this construction, the biasing force of the accumulator compression coil spring 40 is arranged to be greater than the biasing force of the valve biasing compression coil spring 48, so that, in the absence of substantial pressure difference between the accumulator chamber 37 and atmospheric pressure which is introduced into the space to the right hand side of the accumulator piston 36 within the first piston member 9, the biasing action of the accumulator compression coil spring 40 is sufficient to keep the accumulator piston 36 in its leftwardly biased position within the accumulator cylinder bore, against the opposing force of the first valve biasing compression coil spring 48.

In a fashion which will be readily understood by one of ordinary skill in the brake master cylinder art, based upon the foregoing explanations of the various embodiments, the additional provision of this valve, which is opened when the accumulator piston 36 has not substantially moved to the right within the accumulator bore so as to be enlarge the accumulator chamber 37, ensures that fluid flow from the first chamber 13 to the second fluid chamber 14, during the first phase of braking action, when the accumulator piston 36 has not yet started to move, is better and less restricted, because this fluid can flow through the through hole 9a, in addition to its one way flow path through the holes 34 and past the seal element 33. Further, it should be particularly noted that in the second above explained phase of braking operation wherein the spring action of the valve biasing compression coil spring 48 is biasing the valve head 46 and the valve seal element 49 against the left hand end of the transfer hole 9a so as to interrupt communication between the second fluid chamber 14 and the first fluid chamber 13, then, when the hydraulic brake fluid pressure within the third fluid chamber 14 rises substantially, the biasing action of this hydraulic fluid pressure will press harder and harder the first valve head 46 and the first valve seal element 49 against the left hand end of the transfer hole 9a. This provides a fail safe characteristic to the brake master cylinder device according to the shown tenth preferred embodiment of the present invention.

Figure 14:
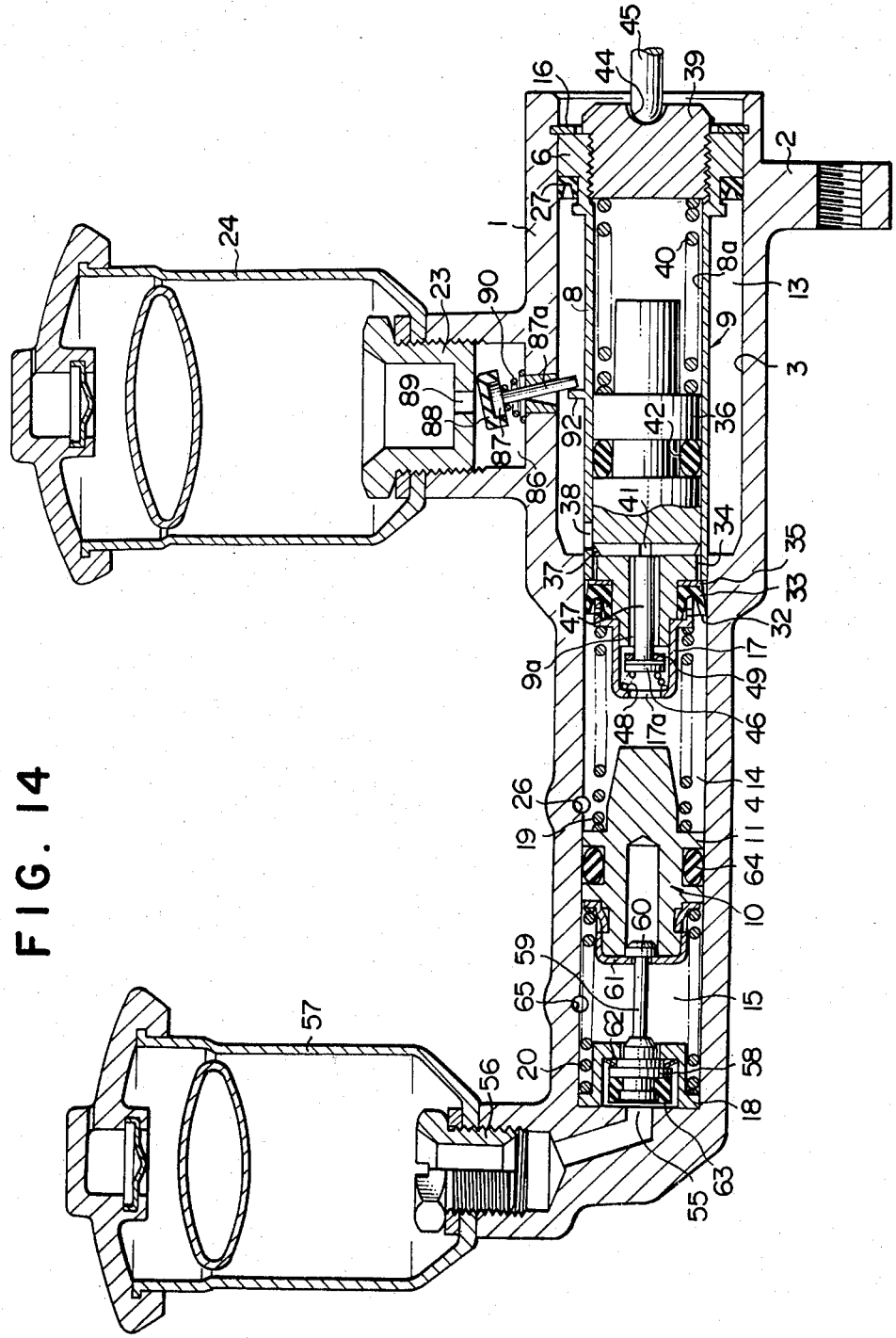
FIG. 14 is a vertical cross sectional view taken along the axis of a brake master cylinder device which is an eleventh preferred embodiment of the present invention, which is very similar to the tenth preferred embodiment of the present invention shown in FIG. 13, but in which the proportions of the parts are different, and a different part of the piston member actuates the refilling valve.

In FIG. 14, an eleventh preferred embodiment of the brake master cylinder device according to the present invention is shown. In this figure, parts which correspond to parts of the already described first through tenth embodiments of the present invention, shown in FIGS. 1, 3, 4, 6, 7, 9, 10, 11, 12, and 13, and which have the same functions, are designated by the same reference numerals as in those figures.

In this eleventh preferred embodiment, the general construction is somewhat different from that of the other shown embodiments, but the function is substantially the same as that of the tenth preferred embodiment of the present invention, shown in FIG. 13, except that no communicating port like the port 99 in that embodiment, which augmented the function of the opening 85, is provided here. In detail, the first piston member 9 is formed with a greater overall diameter than in the other embodiments shown, in order that the accumulator bore formed within its cylindrical portion 8 may be of the greatest possible diameter. In accordance with this, the first piston member 9 is not formed with any small piston land such as the small piston land 7 of the other embodiments shown, but is of an overall diameter equal to the diameter of the small cylinder bore 4, so that the left hand end portion of this first piston member 9 directly engages with the small cylinder bore and fulfils the function of the small piston land 7 in the other embodiments shown. Further, in accordance with this, a projection 92 is provided at an intermediate part of the outer surface of this first piston member 9, for engaging with the lower end of the valve rod 87a in order to operate the valve comprising the valve members 87, etc., thus performing the function which was performed by the right hand end of the small piston land 7 in the seventh through tenth embodiments of the brake master cylinder device according to the present invention shown in FIGS. 10 through 13.

It will be readily appreciated that this construction allows the diameter of the accumulator comprising the accumulator piston 36, etc., to be maximized. Thus, the advantage of this embodiment is that a greater capacity of accumulating brake fluid which is being compressed in the first fluid chamber 13 during the second phase of braking operation, when the second fluid chamber 14 is functioning as a brake master cylinder on its own, is available, than in the other embodiments.

Figure 15:
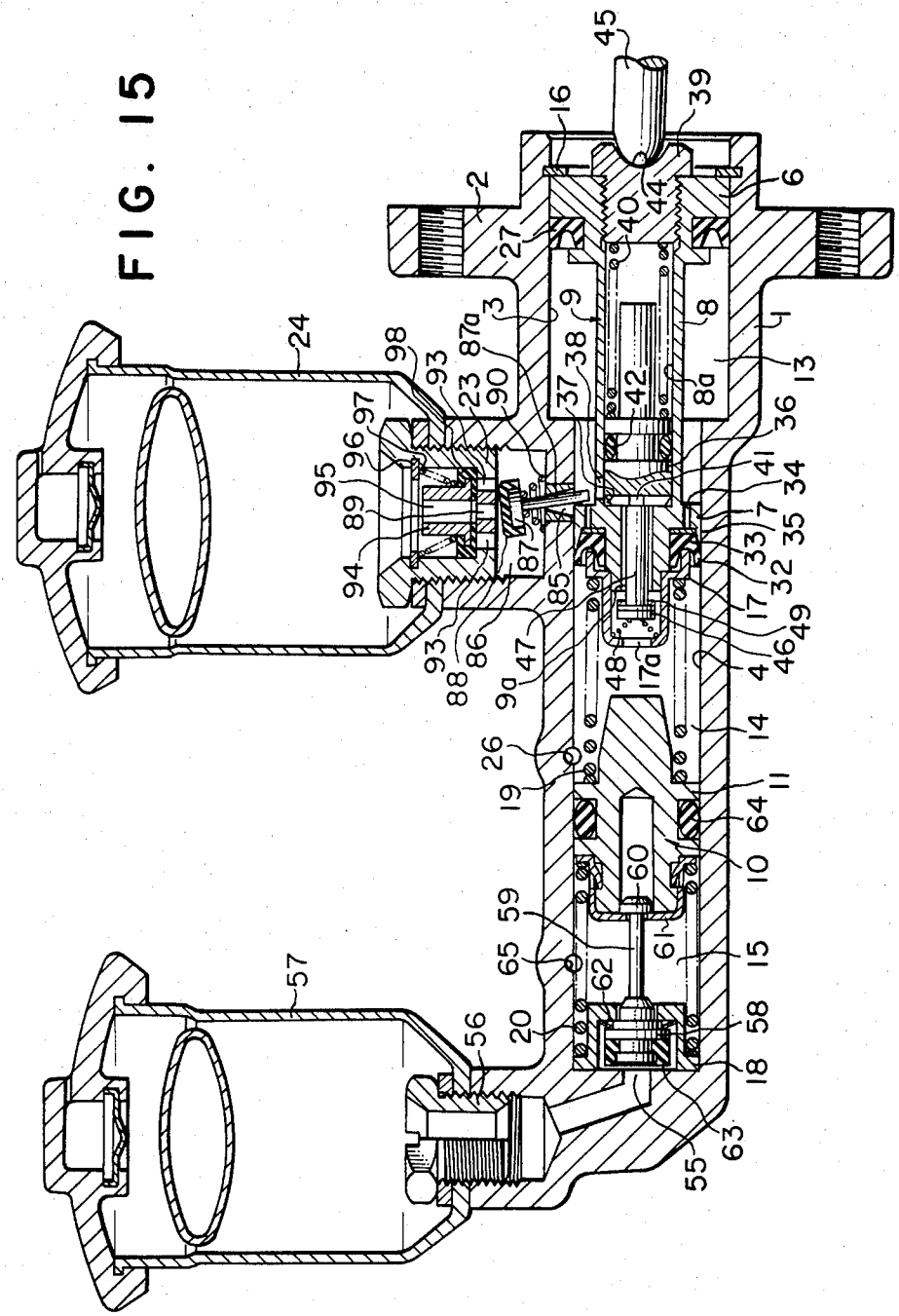
FIG. 15 is a vertical cross sectional view taken along the axis of a brake master cylinder device which is a twelfth preferred embodiment of the present invention, which is similar to the tenth preferred embodiment of the present invention shown in FIG. 13, but in which there is further provided a pressure relief valve for the large chamber thereof.

In FIG. 15, a final twelfth preferred embodiment of the brake master cylinder device according to the present invention is shown. In this figure, parts which correspond to parts of the already described first through eleventh embodiments of the present invention, shown in FIGS. 1, 3, 4, 6, 7, 9, 10, 11, 12, 13, and 14, and which have the same functions, are designated by the same reference numerals as in those figures.

In this twelfth and last preferred embodiment, the general construction is similar to that of the tenth embodiment of the brake master cylinder device according to the present invention, shown in FIG. 13, except for three features.

First, no communicating port is provided in this embodiment like the port 99 in the tenth embodiment, which augmented the function of the opening 85.

Second, no first equalization port is provided in this twelfth embodiment like the first equalization port 84 of the tenth embodiment. This equalization port 84 is not strictly necessary in either the tenth or the twelfth embodiment, because, by the provision of the through hole 9a which communicates the first chamber 13 to the second chamber 14, under the control of the valve comprising the valve head 46 and the valve rod 47, etc., the second chamber 14 will be properly refilled through this through hole 9a, even without the provision of any first equalization port such as the port 84 of the tenth embodiment.

Third and most important, in this embodiment, in parallel with this one way valve which comprises the valve member 87, there is provided a pressure relief valve for relieving the pressure within the first cylinder chamber 13, which will now be explained.

Within the cup shaped nut member 23, above its bottom in the drawing, there is provided a valve element 94 formed as a tube with a central bore 95, which communicates the brake fluid in the interior of the fluid reservoir 24 with the central fluid channel 89 bored through the bottom of the cup shaped nut member 23 which leads to the valve comprising the valve member 87, at all times. Further, in the bottom of the cup shaped nut member 23 there are bored a plurality of side fluid channels 93, two of which are visible in the drawing, and which are offset from the center of the bottom of the cup shaped nut member 23. The upper ends of these side fluid channels 93 are blocked, in the condition of the apparatus shown in the figure, by an annular seal member 98 which is mounted on the bottom end of the valve element 94, and which, together with the valve element 94, is biased downwards in the figure by a conical compression coil spring 97, the upper end of which bears against a snap ring 96 which is fitted within the upper portion of the cup shaped nut member 23.

The conical compression coil spring 97 is arranged to be quite powerful, so that it holds the seal member 98 mounted on the valve element 94 against the upper ends of the side fluid channels 93 in the cup shaped nut member 23, against pressure in the first cylinder chamber 13 and the brake fluid chamber 86, until this pressure reaches a certain predetermined pressure value. However, after the pressure within a first cylinder chamber 13 and the brake fluid chamber 86 reaches this certain predetermined pressure value, then it pushes the valve element 94 upwards in the drawing, against the biasing action of the conical compression coil spring 97 which is overcome, and thereby the first cylinder chamber 13 and the brake fluid chamber 86 are vented to the fluid reservoir 24, and the further rise of fluid pressure within these chambers is restricted.

The operation of the brake master cylinder device explained above according to the present invention may be summarized as follows.

Until the pressure within the first fluid chamber 13 and the accumulator chamber 37 communicated therewith rises to said predetermined pressure value which opens the valve comprising the valve member 94, etc., which must, for the proper operation of this brake master cylinder device, be definitely substantially greater than the predetermined fluid pressure value which starts the accumulator piston 36 moving rightwards in the figure in the accumulator bore against the action of the compression coil spring 40 so as to close the valve comprising the valve member 46 and the valve rod 47, the function of this twelfth preferred embodiment of the brake master cylinder device according to the present invention is the same as that of the tenth preferred embodiment of the present invention shown in FIG. 13. However, after the accumulator chamber 37 has absorbed a substantial amount of brake fluid, and after the accumulator piston 36 has moved through a substantial distance rightward in the accumulator bore with respect to the first piston member 9, during the second stage of brake operation when the second fluid chamber 14 is functioning as a brake master cylinder on its own, then, by the compression of the comparison coil spring 40, its resilient force increases, and accordingly the pressure within the first fluid chamber 13 and the brake fluid chamber 86 rises. When this pressure reaches the aforementioned predetermined value, which is determined by the strength of the conical compression coil spring 97, and the size and number of the side fluid channels 93, then it pushes the valve element 94 upwards in the drawing, overcoming the spring force of the conical compression coil spring 97, so as to open the ends of the side fluid channels 93, and hence the first cylinder chamber 13 is vented, via the opening 85, the brake fluid chamber 86, the side fluid channels 93, and past the seal member 98 mounted on the valve element 94, to the interior of the brake fluid reservoir 24, and accordingly, from this condition, as the first piston member 9 is displaced further to the left within the large cylinder bore 3 and the small cylinder bore 4 by further increase of pressure of the foot of the operator of the vehicle upon the brake pedal thereof, the hydraulic brake fluid pressure within the first fluid chamber 13 and the accumulator chamber 37 does not substantially increase further, because the diminution in the volume of the first fluid chamber 13, caused by the difference in the diameters of the large cylinder bore 3 and the small cylinder bore 4, and the associated difference in the cross sectional areas thereof, drives hydraulic brake fluid out of the first fluid chamber 13, through the aforementioned venting system, to be stored in the fluid reservoir 24. Thereby, further compression of hydraulic brake fluid within the diminishing volume of the first fluid chamber 13 is prevented, by the accomodation of this excess hydraulic brake fluid within the brake fluid reservoir 24.

The other operational phases of this twelfth preferred embodiment of the present invention, such as the brake return phase when the operator of the vehicle releases the pressure on the brake pedal thereof so as to allow the first piston member 9 to return rightwards in the figure, are quite the same as those of the tenth preferred embodiment shown in FIG. 13, and accordingly no description of them will be given, in the interests of succinctness of explanation.

An advantage of this twelfth preferred embodiment, which employs the concept of venting the accumulator chamber 37 and the first fluid chamber 13 at a second predetermined critical fluid pressure value which is substantially higher than the first predetermined critical fluid pressure value which starts the operation of the accumulator comprising the accumulator piston 36, etc., to the fluid reservoir 24, is that by the employment of this construction a substantially greater capacity for diminution in the volume of the first fluid chamber 13 is made available than was the case in the tenth preferred embodiment of the brake master cylinder device according to the present invention shown in FIG. 13.

Further, if by any chance the accumulator piston 36 should stick within the accumulator bore formed within the first piston member 9, due to dirt or the like, then the venting action of the venting valve comprising the valve element 94, the conical compression coil spring 97, etc., ensures that it is still possible for the first piston member 9 to continue moving leftwards in the figure in order to apply the brakes of the vehicle, because in this event the pressure within the first fluid chamber 13 and the accumulator chamber 37 and the brake fluid chamber 86 will very quickly rise up to the second predetermined critical fluid pressure value, and the valve comprising the valve element 94 and the conical compression coil spring 97, etc., will then open and vent these chambers to the brake fluid reservoir 24, thus limiting the pressure rise therein.

In the above described preferred embodiments, the brake master cylinder device according to the present invention has been described as applied to one system only of a tandem master cylinder device, but the present invention is not limited to this application. In fact, the present invention might equally be applied to both systems of a tandem master cylinder device, for added efficiency. Further, the present invention could be applied to a single type master cylinder device, which supplied hydraulic pressure to both the front braking system of a vehicle, and to the rear braking system thereof. The essential concept of the present invention is the provision of the first and second fluid chambers 13 and 14, both of which are reduced in size as the first piston member moves due to application of force to the braking member of the vehicle by the driver thereof, with the fluid transfer means which allows fluid to pass substantially freely from the first cylinder chamber to the second cylinder chamber, and the provision of the accumulator, communicated with the first cylinder chamber, which commences accumulating fluid therefrom, when the pressure therein rises above said certain predetermined pressure value.

Therefore, although the present invention has been shown and described in terms of several preferred embodiments thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. For example, it is not essential that the first and second cylinder chambers should be coaxial, nor that the end of the first cylinder chamber remote from the first piston should be defined by the other side of the second piston from the side thereof which defines the second cylinder chamber, as was the case in the shown embodiments; the first and second pressure chambers could be, for example, mounted side by side, and in that case the first piston would not be required to be larger in diameter than the second piston. All that is required, in the present invention, is that the motion of the first piston member, comprising the first and the second pistons, in a certain direction should reduce both the volume of the first and also of the second pressure chambers, together. Therefore, it is expressly desired that the scope of the present invention should be uniquely delimited by the legitimate and valid scope of the appended claims, which follow, and not by any of the perhaps purely fortuitous details of the shown embodiments, or of the drawings.

I claim:

1. A brake master cylinder device, comprising:
   (a) a body within which are formed a first cylinder bore and a second cylinder bore, the diameter of said first cylinder bore being substantially larger than that of said second cylinder bore;
   (b) a first piston member, comprising a first piston engaged with said first cylinder bore and a second piston engaged with said second cylinder bore, a second piston member comprising a third piston engaged with said second cylinder bore, a first cylinder chamber, a second cylinder chamber, and a third cylinder chamber being, respectively, defined by the cooperation of said first piston with said first cylinder bore, by the cooperation of said second piston with said second cylinder bore, and by the cooperation of said third piston with said second cylinder bore, a compression coil spring disposed between said second piston and said third piston so as to balance the fluid pressures generated in said second and third cylinder chambers, the displacement of said first piston member with respect to said body in a first direction tending to reduce the volume of said first cylinder chamber and also to reduce the volume of said second and third cylinder chambers;
   (c) first means for biasing said first piston member in a direction opposite to said first direction with respect to said body;
   (d) a fluid reservoir;
   (e) a first fluid conduit opening from said second cylinder chamber for connection to a first brake actuator in order to supply operating fluid pressure thereto, and a second fluid conduit opening from said third cylinder chamber for connection to a second brake actuator in order to supply operating fluid pressure thereto;
   (f) a fluid accumulator communicated with said first cylinder chamber, which commences accumulating fluid therefrom when the fluid pressure therein rises to a predetermined pressure value, said fluid accumulator having an accumulator cylinder bore formed in said first piston member, an accumulator piston engaged with said accumulator cylinder bore, an accumulator chamber defined on one side of said accumulator piston by the cooperation of said accumulator piston with said accumulator cylinder bore, and a means for biasing said accumulator piston in a direction tending to reduce the volume of said accumulator chamber, said accumulator piston being driven against the force exerted by said means for biasing said accumulator piston only by the pressure of fluid in said first cylinder chamber after said accumulator chamber has commenced to accumulate fluid therein;
   (g) means for refilling said first cylinder chamber, which allows fluid to flow substantially freely from said fluid reservoir to said first cylinder chamber at least when said first piston member is in its extreme position in said direction opposite to said first direction;
   (h) means for transferring fluid, which allows fluid to pass substantially freely from said first cylinder chamber to said second cylinder chamber; and
   (i) means for releasing fluid from said second cylinder chamber towards said fluid reservoir, at least when said first piston member is in its extreme position in said direction opposite to said first direction;
   (j) whereby as said first piston member is displaced in said first direction from its extreme position in said direction opposite to said first direction, as the pressure within said first and second fluid conduits and said second and third cylinder chambers rise so as progressively to operate said first and second brake actuators more and more, and until the pressure in said first cylinder chamber reaches said predetermined pressure value, said pressure in said first cylinder chamber is substantially the same as that in said second and third cylinder chambers, said transferring means allowing substantially free passage of fluid from said first cylinder chamber to said second cylinder chamber; but, after the pressure in said first cylinder chamber has reached said predetermined said pressure value, further substantial rising of the fluid pressure within said first cylinder chamber only is hindered, as said accumulator starts to function and accumulates fluid from said first cylinder chamber;
   (k) whereby the pressure available in said first and second fluid conduits, for a given amount of pressure exerted on said first piston member in said first direction, is higher in the latter period of operation of said master cylinder device, after said accumulator has started to accumulate fluid from said first cylinder chamber, than in the former period of operation of said master cylinder device, before said accumulator has started to accumulate fluid from said first cylinder chamber.

2. A brake master cylinder device according to claim 1, wherein: the diameter of said first cylinder bore and of said first piston is substantially larger than the diameter of said second cylinder bore and of said second piston; said first cylinder bore, said first piston, said second cylinder bore, and said second piston are all coaxial; one end of said first cylinder chamber is defined by one side of said first piston; and the other end of said first cylinder chamber is defined by one side of said second piston; the other side of said second piston defining one end of said second cylinder chamber; motion of said first piston member in said first direction moving said first piston towards said second cylinder bore;

whereby, as said first piston member is moved in said first direction from its extreme position in said direction opposite to said first direction, the volume of said first cylinder chamber diminishes, according to the difference in cross sectional areas of said first piston and said second piston.

3. A brake master cylinder device according to claim 2, wherein said transferring means comprises a first one way valve, comprising a seal member which comprises: (a) a disk shaped element mounted to said other side of said second piston and of substantially the same diameter as said second piston, and (b) a flexible annular lip extending from the periphery of said disk shaped element in the direction away from said first cylinder chamber and bearing on the wall of said second cylinder bore; fluid flow from said second cylinder chamber to said first cylinder chamber being positively prevented by said annular lip being pressed against the wall of said second cylinder bore by the presence of a higher fluid pressure in said second cylinder chamber than in said first cylinder chamber, and flow of fluid from said first cylinder chamber to said second cylinder chamber being allowed by said annular lip being deflected away from the wall of said second cylinder chamber by the presence of a higher pressure in said first cylinder chamber than in said second cylinder chamber.

4. A brake master cylinder device according to claim 3, wherein said accumulator comprises an accumulator piston and a compression coil spring which biases said accumulator piston in a direction to reduce the size of a fluid chamber defined by said accumulator piston in said accumulator.

5. A brake master cylinder device according to claim 4, wherein said transferring means further comprises a first valve, comprising a passage communicating between said first cylinder chamber and said second cylinder chamber, and a valve member which is displaced to open said passage by said accumulator piston when said accumulator piston is in its position in which the size of said accumulator chamber is at its minimum value, and which is released so as to close said passage by said accumulator piston, when said accumulator piston has moved from said position in the direction to increase the size of said accumulator chamber by more than a predetermined relatively small distance.

6. A brake master cylinder device according to claim 4, wherein said accumulator is provided within said first piston member.

7. A brake master cylinder device according to claim 5, wherein said first valve and said accumulator are provided within said first piston member.

8. A brake master cylinder device according to claim 3, wherein no other flow path exists for communicating said first cylinder chamber and said second cylinder chamber, when said first piston member is not in its extreme position in said direction opposite to said first direction, than said first one way valve.

9. A brake master cylinder device according to claim 8, further comprising a second one way valve, which allows fluid to flow substantially freely from said fluid reservoir to said first cylinder chamber, when the pressure in said first cylinder chamber is substantially below the pressure of the fluid in said fluid reservoir.

10. A brake master cylinder device according to claim 9, wherein said second one way valve comprises a valve port, a valve element, and a means for biasing said valve element against said valve port, so as to block it, weakly with relation to the force of atmospheric pressure acting over the area of said valve port; said fluid reservoir containing fluid at atmospheric pressure and being communicated to said valve port, and said first cylinder chamber being communicated to the other side of said valve element from said valve port; and wherein said refilling means comprises a rod extending from said valve element and protruding into said first cylinder chamber through an aperture in said first cylinder bore; and wherein, when said first piston member reaches its extreme position in said direction opposite to said first direction, a part of said first piston member abuts against said rod and tilts said valve element so that said valve element no longer blocks said valve port; whereby said first cylinder chamber is refilled with fluid from said reservoir substantially freely, when said first piston member reaches its said extreme position in said direction opposite to said first direction; and whereby, when the pressure in said first cylinder chamber is below substantially atmospheric pressure, the difference between the fluid pressures on opposite sides of said valve element impels said valve element away from said valve port, so as to allow fluid to flow substantially freely from said fluid reservoir into said first cylinder chamber.

11. A brake master cylinder device according to claim 10, further comprising a second accumulator, mounted substantially on the outside of said body, and communicated to said first cylinder chamber.

12. A brake master cylinder device according to claim 10, further comprising a restricted orifice which at all times communicates said first cylinder chamber to said fluid reservoir.

13. A brake master cylinder device according to claim 7, wherein said means for releasing fluid from said second cylinder chamber towards said fluid reservoir is said first valve, and no other flow path exists for releasing fluid from said second fluid chamber towards said fluid reservoir, than said first valve.

14. A brake master cylinder device according to claim 7, wherein said means for releasing fluid from said second cylinder chamber towards said fluid reservoir is an aperture in the wall of said second cylinder bore which leads therefrom to said fluid reservoir, and which is communicated to said second cylinder chamber, only when said first piston member is in substantially its extreme position in said direction opposite to said first direction.

15. A brake master cylinder device according to claim 7, further comprising a replenishing cylinder chamber defined at the other side of said first piston, said replenishing chamber being always communicated substantially freely to said fluid reservoir, and said replenishing chamber being communicated to said first cylinder chamber via a third one way valve, comprising a seal member which comprises: (a) a disk shaped element mounted to said one side of said first piston and of substantially the same diameter as said first piston, and (b) a flexible annular lip extending from the periphery of said disk shaped element in the direction away from said replenishing cylinder chamber and bearing on the wall of said first cylinder bore; fluid flow from said first cylinder chamber to said replenishing cylinder chamber being positively prevented by said annular lip being pressed against the wall of said first cylinder bore by the presence of a higher fluid pressure in said first cylinder chamber than in said replenishing cylinder chamber, and flow of fluid from said replenishing cylinder chamber to said first cylinder chamber being allowed by said annular lip being deflected away from the wall of said first cylinder chamber by the presence of a higher pressure in said replenishing cylinder chamber than in said first cylinder chamber.

16. A brake master cylinder device according to claim 7, further comprising a second one way valve, which allows fluid to flow substantially freely from said fluid reservoir to said first cylinder chamber, when the pressure in said first cylinder chamber is substantially below the pressure of the fluid in said fluid reservoir.

17. A brake master cylinder device according to claim 16, wherein said second one way valve comprises a valve port, a valve element, and a means for biasing said valve element against said valve port, so as to block it, weakly with relation to the force of atmospheric pressure acting over the area of said valve port; said fluid reservoir containing fluid at atmospheric pressure and being communicated to said valve port, and said first cylinder chamber being communicated to the other side of said valve element from said valve port; and wherein said refilling means comprises a rod extending from said valve element and protruding into said first cylinder chamber through an aperture in said first cylinder bore; and wherein, when said first piston member reaches its extreme position in said direction opposite to said first direction, a part of said first piston member abuts against said rod and tilts said valve element so that said valve element no longer blocks said valve port; whereby said first cylinder chamber is refilled with fluid from said reservoir substantially freely, when said first piston member reaches its said extreme position in said direction opposite to said first direction, and whereby, when the pressure in said first cylinder chamber is below substantially atmospheric pressure, the difference between the fluid pressures on opposite sides of said valve element impels said valve element away from said valve port, so as to allow fluid to flow substantially freely from said fluid reservoir into said first cylinder chamber.

18. A brake master cylinder device according to claim 17, wherein said first piston member is formed with a tubular body with a bore formed therein which receives said accumulator piston, the end of said tubular body nearest to said second cylinder chamber constituting said second piston, and with a projection from said tubular body for abutting against said rod.

19. A brake master cylinder device according to claim 17, further comprising a means for venting said first cylinder chamber, which allows fluid to flow from said first cylinder chamber to said fluid reservoir when the fluid pressure in said first cylinder chamber rises to a predetermined fluid pressure value which is substantially higher than the fluid pressure value within the first cylinder chamber which is sufficient to move said accumulator piston through more than said predetermined relatively small distance, comprising a valve port, a valve element, and a means for biasing said valve element against said valve port so as to block it; said reservoir being communicated to the other side of said valve element from said valve port, and said first cylinder chamber being communicated to said valve port; said biasing means holding said valve element against said valve port, so as to block it, when the fluid pressure in said first cylinder chamber is below said predetermined fluid pressure value; but being overcome by the force due to said fluid pressure in said first cylinder chamber acting on said valve element and allowing said valve element to be moved away from said valve port by said force, when the fluid pressure in said first cylinder chamber is equal to or higher than said predetermined fluid pressure value.

20. A brake master cylinder device according to claim 19, wherein said venting means is provided within said body.

21. A brake master cylinder device according to claim 15, further comprising a second accumulator, mounted substantially on the outside of said body, and communicated to said first cylinder chamber; said second accumulator commencing to accumulate fluid at a predetermined pressure which is substantially higher than the fluid pressure value within said first cylinder chamber which is sufficient to move said piston of said first accumulator through more than said predetermined relatively small distance.

22. A brake master cylinder device according to claim 15, further comprising a means for venting said first cylinder chamber, which allows fluid to flow from said first cylinder chamber to said fluid reservoir when the fluid pressure in said first cylinder chamber rises to a predetermined fluid pressure value substantially higher than the fluid pressure value within the first cylinder chamber which is sufficient to move said accumulator piston through more than said predetermined relatively small distance, comprising a valve port, a valve element, and a means for biasing said valve element against said valve port so as to block it; said reservoir being communicated to the other side of said valve element from said valve port, and said first cylinder chamber being communicated to said valve port; said biasing means holding said valve element against said valve port, so as to block it, when the fluid pressure in said first cylinder chamber is below said predetermined fluid pressure value; but being overcome by the force due to said fluid pressure in said first cylinder chamber acting on said valve element and allowing said valve element to be moved away from said valve port by said force, when the fluid pressure in said first cylinder chamber is equal to or higher than said predetermined fluid pressure value.

23. A brake master cylinder device according to claim 22, wherein said venting means is located within said first piston member, said valve port being the end of a central bore formed along the axis of said accumulator piston.

24. A brake master cylinder device according to claim 23, wherein said biasing means comprises a compression coil spring, one end of which bears against said valve element so as to bias it against said end of said bore, and the other end of which bears against said first piston member.

25. A brake master cylinder device according to claim 23, wherein said biasing means comprises a compression coil spring, one end of which bears against said valve element so as to bias it against said end of said bore, and a retaining member which is fixed with respect to said accumulator piston, the other end of said compression coil spring bearing against said retaining member.

26. A brake master cylinder device according to claim 15, further comprising a means for venting said first cylinder chamber, which allows fluid to flow from said first cylinder chamber to said fluid reservoir, via said replenishing chamber, when said accumulator piston has moved through a second predetermined distance which is substantially greater than said first relatively small predetermined distance.

27. A brake master cylinder device according to claim 26, wherein said venting means comprises a valve port, a valve element, a means for biasing said valve element against said valve port, and a displacing member which bears against said valve element, so as to displace it from said valve port, when said accumulator piston has moved through said second predetermined distance.

28. A brake master cylinder device according to claim 27, wherein said valve port is the end of a bore formed in said first piston member in which said accumulator piston reciprocates, wherein said displacing member is a step formed on said accumulator piston at its end remote from said accumulator fluid chamber between a part thereof which passes through a hole in said valve element with a sliding fluid seal being formed therebetween, and a part thereof which is too large to pass through said hole, and wherein a passage is formed in said accumulator piston between said accumulator chamber and said step.

29. A brake master cylinder device according to claim 27, wherein said port is the end of an axial through hole formed along the axis of said accumulator piston nearest to said first valve, and said displacing member is a rod, one end of which is coupled to said first piston member, and the other end of which extends into said axial through hole with a certain space between it and the sides of said axial through hole.

* * * * *